US012780238B2

(12) United States Patent
Ran et al.

(10) Patent No.: US 12,780,238 B2
(45) **Date of Patent: *Nov. 3, 2026**

(54) CLOUD-BASED FUNCTION ALLOCATION SYSTEM FOR DISTRIBUTED DRIVING INTELLIGENCE

(71) Applicant: CAVH LLC, Fitchburg, WI (US)

(72) Inventors: Bin Ran, Fitchburg, WI (US); Peipei Mao, Madison, WI (US); Wenqi Lu, Madison, WI (US); Ziwei Yi, Madison, WI (US); Linheng Li, Madison, WI (US); Yang Cheng, Middleton, WI (US); Linghui Xu, Madison, WI (US); Yuan Zheng, Madison, WI (US); Tianyi Chen, Madison, WI (US); Haotian Shi, Madison, WI (US); Keshu Wu, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/809,933

(22) Filed: Aug. 20, 2024

(65) Prior Publication Data

US 2024/0409114 A1 Dec. 12, 2024

Related U.S. Application Data

(63) Continuation of application No. 17/499,283, filed on Oct. 12, 2021, now Pat. No. 12,077,175.

(Continued)

(51) Int. Cl.

*B60W 60/00* (2020.01)
*B60W 40/04* (2006.01)

(Continued)

(52) U.S. Cl.

CPC ............ *B60W 60/00* (2020.02); *B60W 40/04* (2013.01); *B60W 40/06* (2013.01); *G06V 20/56* (2022.01);

(Continued)

(58) Field of Classification Search

CPC ...... B60W 60/00; B60W 40/04; B60W 40/06; B60W 2555/20; B60W 2556/45;

(Continued)

(56) References Cited

U.S. PATENT DOCUMENTS 10,380,886 B2 8/2019 Ran et al.
10,692,365 B2 6/2020 Ran et al.

(Continued)

OTHER PUBLICATIONS

SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806).

*Primary Examiner* — Abdhesh K Jha
*Assistant Examiner* — Alexander George Matta
(74) *Attorney, Agent, or Firm* — Casimir Jones, SC; Thomas A. Isenbarger

(57) ABSTRACT

Provided herein is technology relating to a function allocation system (FAS) that deploys artificial intelligence models for a connected automated highway (CAH) system and a connected automated vehicle (CAV) system to distribute driving intelligence between the CAV system and the CAH system. The FAS comprises a communication module, a data module, and a computing module. The computing module is configured to analyse scenes using sensing data, determine automated driving function requirements, deploy function allocation methods, and analyse CAH system and CAV system functions. The function allocation methods provide analysis, guidance, and optimization capabilities for sensing, decision-making, and control functions. The FAS allocates (Continued)

automated driving functions to the CAV system and the CAH system based on their respective intelligence levels. The technology aims to enhance automated driving and ensure driving safety by leveraging function allocation models and algorithms for optimal function distribution between vehicles and the infrastructure.

20 Claims, 10 Drawing Sheets

Related U.S. Application Data

(60) Provisional application No. 63/091,632, filed on Oct. 14, 2020.

(51) Int. Cl.
*B60W 40/06* (2012.01)
*G06V 20/56* (2022.01)
*H04W 4/44* (2018.01)

(52) U.S. Cl.
CPC .......... *H04W 4/44* (2018.02); *B60W 2555/20* (2020.02); *B60W 2556/45* (2020.02)

(58) Field of Classification Search
CPC .......... B60W 2756/10; B60W 60/001; B60W 40/02; B60W 40/10; B60W 40/105; B60W 2552/50; B60W 2552/53; G06V 20/56; H04W 4/44; G06F 18/251; H04L 67/12
See application file for complete search history.

(56) References Cited

U.S. PATENT DOCUMENTS

| | | | | |
|---|---|---|---|---|
| 12,340,685 | B2 * | 6/2025 | Boenisch | H04W 4/44 |
| 2018/0336780 | A1 | 11/2018 | Ran et al. | |
| 2019/0086914 | A1 | 3/2019 | Yen | |
| 2019/0096238 | A1 * | 3/2019 | Ran | G08G 1/164 |
| 2019/0244521 | A1 | 8/2019 | Ran et al. | |
| 2019/0340921 | A1 | 11/2019 | Ran et al. | |
| 2019/0347931 | A1 | 11/2019 | Ding et al. | |
| 2020/0005633 | A1 | 1/2020 | Jin et al. | |
| 2020/0017117 | A1 * | 1/2020 | Milton | G06N 3/09 |
| 2020/0019445 | A1 * | 1/2020 | Altintas | G06F 9/5038 |
| 2020/0021961 | A1 | 1/2020 | Li et al. | |
| 2020/0142408 | A1 | 5/2020 | Valois | |
| 2020/0168081 | A1 | 5/2020 | Ran et al. | |
| 2021/0065547 | A1 | 3/2021 | Ran et al. | |
| 2021/0311491 | A1 | 10/2021 | Li et al. | |
| 2021/0314752 | A1 | 10/2021 | Ran et al. | |
| 2021/0394797 | A1 | 12/2021 | Ran et al. | |
| 2022/0026224 | A1 * | 1/2022 | Zhao | G05D 1/0219 |

* cited by examiner

CLOUD-BASED FUNCTION ALLOCATION SYSTEM FOR DISTRIBUTED DRIVING INTELLIGENCE

This application is a continuation of U.S. patent application Ser. No. 17/499,283, filed Oct. 12, 2021, now U.S. Pat. No. 12,077,175, issued Sep. 3, 2024, which claims the benefit of U.S. Provisional Patent Application No. 63/091,632, filed Oct. 14, 2020, each of which is incorporated herein by reference in its entirety.

FIELD

Provided herein is technology relating to intelligent transportation systems and automated vehicles and particularly, but not exclusively, to function allocation systems and methods for a connected automated vehicle highway system that provides transportation management and operations and vehicle control for connected and automated vehicles.

BACKGROUND

Connected and Automated Vehicles (CAV) that are capable of automated driving under certain conditions are in development. Usage of present CAV technologies is limited by costs (e.g., capital and/or energy costs) associated with the numerous sensors and computation devices provided on CAV and CAV performance is limited by the functional capabilities of sensors provided on CAV.

SUMMARY

Very recently, technologies have been developed to address some of these problems. For example, a connected automated vehicle highway (CAVH) system and/or components thereof and an Automated Driving System (ADS) and/or components thereof is/are described in, e.g., U.S. Pat. App. Pub. Nos. 20190096238; 20190340921; 20190244521; 20200005633; 20200168081; and 20200021961; in U.S. patent application Ser. No. 16/996,684 (published as U.S. Pat. App. Pub. No. 20210065547); 63/004,551 (to which U.S. patent application Ser. No. 17/192,529 claims priority); and 63/004,564 (to which U.S. patent application Ser. No. 17/192,441 claims priority), and in U.S. Pat. Nos. 10,380,886; and 10,692,365, each of which is incorporated herein by reference.

CAVH systems provide an important transportation technology because they reduce and/or manage traffic congestion, improve and/or maximize traffic safety, and/or reduce traffic pollution. CAVH systems use advanced in-vehicle and roadside sensing equipment (e.g., radar and video camera) to sense the traffic environment in real-time and with high-precision and use next-generation information and computing technologies (e.g., artificial intelligence, 5G communication, and big data) to provide communication among vehicles, infrastructure, and drivers; and to execute control instructions according to communication protocols and data interaction standards. The CAVH system thus provides a new-generation intelligent transportation system that integrates intelligent dynamic information services, intelligent traffic control, and connected automated driving. See, e.g., U.S. Pat. App. Pub. No. 20190340921, incorporated herein by reference.

Currently, some implementations of CAVH systems comprise a connected automated highway (CAH) system and a connected automated vehicle (CAV) system having a variety of intelligence levels. See, e.g., U.S. Pat. App. Pub. No. 20190347931A1, incorporated herein by reference. Accordingly, present CAVH systems cooperatively carry out sensing, decision-making, and control for both vehicles and highways to complete automated driving tasks.

Present CAVH systems could be improved by incorporating function allocation technologies into the CAVH system. For example, the efficiency and reliability of CAVH systems could be improved by minimizing and/or eliminating functional overlap and information redundancy among CAVH subsystems, e.g., the CAV system and the CAH system, that manage and conduct automated driving tasks. Accordingly, the technology provided herein improves CAVH system efficiency and safety by allocating automated vehicle sensing, decision-making, and control functions among the CAH system and CAV system at different intelligence levels and according to different scenarios. In particular, the technology provided herein assists the CAV system and CAH system in executing automated driving tasks in a safe, collaborative, and efficient manner.

Thus, the present technology relates to function allocation for a CAVH system. For example, in some embodiments, the technology provides a function allocation system (FAS). In some embodiments, the FAS comprises a communication module, a data module, and/or a computing module. In some embodiments, the FAS is configured to allocate sensing, decision-making, and/or control functions at different intelligence levels and/or in different driving scenarios. In some embodiments, the FAS provides distribution; intelligence; collaboration; and/or integration for a CAVH system.

In some embodiments, the technology provides a CAVH system comprising a CAH system, a CAV system, and a FAS. In some embodiment, the CAH system and the CAV system have different intelligence levels. In some embodiments, the intelligence level of the CAH system is higher than the CAV system. In some embodiments, the CAH system provides more control and decision-making than the CAV system, e.g., in some embodiments, more than 50% (e.g., 51, 55, 60, 65, 70, 75, 80, 85, 90, 95, 99, or 100%) of CAVH control and decision-making is provided by the CAH system. In some embodiments, a driver can assume control of a CAV.

In some embodiments, the CAH system comprises a sensing module, a decision-making module, a control module, and/or a communication module. In some embodiments, the sensing module comprises environmental sensing devices, vehicle detection devices, and/or high-precision positioning systems. In some embodiments, the decision-making module is configured to process information and/or generate control instructions. In some embodiments, the decision-making module is provided by a traffic control center (TCC). In some embodiments, the decision-making module comprises a traffic control center (TCC). In some embodiments, a TCC comprises the decision-making module. In some embodiments, the TCC processes information and/or generates control instructions on a macroscopic scale. In some embodiments, the TCC processes information and/or generates control instructions on a mesoscopic scale (e.g., for a region). In some embodiments, the TCC processes information and/or generates control instructions on a microscopic scale (e.g., for a road or a road segment). In some embodiments, the control module is provided by a traffic control unit (TCU) and/or a roadside intelligent unit (RIU). In some embodiments, the control module comprises a traffic control unit (TCU) and/or a roadside intelligent unit (RIU). In some embodiments, a TCU comprises the control module. In some embodiments, an RIU comprises the control module. In some embodiments, a TCU and an RIU cooperate to provide the control module (e.g., the control module is distributed between the TCU and RIU). In some embodiments, the TCU controls traffic and/or vehicles on a macroscopic scale and/or on a mesoscopic scale (e.g., for a road section). In some embodiments, the TCU controls traffic and/or vehicles on a microscopic scale (e.g., for a point on a road). In some embodiments, the communication module comprises a terminal communication module. In some embodiments, the terminal communication module supports multiple communication modes, e.g., 3G, 4G, 5G, or 6G cellular communications; GPS; and/or WIFI (IEEE 802.11).

In some embodiments, the CAH system is configured to: 1) sense the surrounding environment (e.g., recognize obstacles, signs, and/or road markings) and detect the moving state of vehicles; 2) determine optimal control objectives for managing traffic and make multi-objective decisions to manage traffic flow; 3) manage traffic according to the decision results (e.g., to optimize traffic flow); and/or 4) support infrastructure-to-cloud (I2N) communication, infrastructure-to-vehicle (I2V) communication, infrastructure-to-human (I2P) communication, and/or infrastructure-to-infrastructure (I2I) communication; and/or provide information exchange and fusion functions.

In some embodiments, the CAH system comprises a CAH system sensing module configured to obtain vehicle status and environmental data; a CAH system communication module configured to exchange data with the FAS and/or to send instructions to the CAV system for executing vehicle control; a CAH system decision-making module configured to make decisions for managing and/or optimizing traffic flow; and/or a CAH system control module configured to allocate control instructions to vehicles.

In some embodiments, the CAV system is configurable. In some embodiments, the CAV is configured to have one of a number of different configurations comprising one or more various physical subsystems and/or providing one or more various functions. In some embodiments, the CAV system is configured to comprise a CAV system sensing module comprising road environmental sensing equipment and vehicle positioning equipment; a CAV system decision-making module comprising hardware and software components; a CAV system control module comprising a microprocessor, a wire-controlled brake, a wire-controlled steering and chassis integrated control system; and/or a CAV system communication module comprising a terminal communication module configured to support multiple communication modes, e.g., 3G, 4G, 5G, or 6G cellular communications; GPS; and/or WIFI (IEEE 802.11).

In some embodiments, the CAV system sensing module is configured to sense and obtain road environment and vehicle data, e.g., vehicle data (e.g., vehicle location, velocity, acceleration, and/or steering angle), weather data (e.g., visibility, precipitation, wind, temperature), and/or traffic data (e.g., traffic congestion level, incident information). In some embodiments, the CAV system decision-making module is configured to predict vehicle behavior and make decisions (e.g., plan vehicle paths, optimize vehicle trajectories) for CAV. In some embodiments, the CAV system control module is configured to receive decision-making instructions from the system, to provide automated driving functions or advanced driving assistance functions, to improve and/or to maximize vehicle safety, and to control the horizontal and vertical motion of CAV. In some embodiments, the CAV system communication module is configured to send and receive information and data and to fuse information and data from different sources and/or in different scenarios.

In some embodiments, the CAV system provides functions that are supported by the CAV system sensing module, communication module, decision-making module, and/or vehicle control module. For example, in some embodiments, the CAV system sensing module obtains vehicle motion and environmental data; the CAV system communication module is configured to exchange data among vehicles and FAS; the FAS transmits (e.g., using the FAS communication module) assigned tasks to a vehicle and/or transmits (e.g., using the FAS communication module) vehicle sensing information to the CAV system and/or to the CAH system; and/or the CAV system decision-making module and/or CAV system control module implement vehicle control, e.g., according to the FAS allocation of tasks and functions to the CAV system and CAV.

In some embodiments, the FAS is configurable. In some embodiments, the FAS is configured to have one of a number of different configurations comprising one or more various physical subsystems and/or providing one or more various functions. In some embodiments, the FAS is configured to comprise a FAS communication module comprising a terminal communication module configured to support multiple communication modes, e.g., 3G, 4G, 5G, or 6G cellular communications; GPS; and/or WIFI (IEEE 802.11); a FAS data module comprising a database server, a core switch (e.g., configured to control access to a wide area network and/or the internet), a firewall, intrusion detection equipment, an optical switch, and/or a disk array; and/or a FAS computing module comprising a database engine server, an identity authentication server, a data management and exchange server, an optimized distribution subsystem server, and/or a web application server.

In some embodiments, the FAS provides functions that are supported by a FAS data module to provide storage and backup and/or data processing and operations. For example, in some embodiments, the FAS receives (e.g., using the FAS communication module) system-level information and/or environment sensing data from the CAV system and/or from the CAH system; the FAS transmits the system-level information and/or environment sensing data to the FAS data module for storage and/or backup; the FAS data module stores and/or backs-up environment sensing data and performs data operations and processing on the environment sensing data; the FAS decomposes the current scene into a number of sub-scenes (e.g., using a FAS computing module configured to perform scene analysis) and designs a function allocation strategy (e.g., comprising a function allocation result) according to the sensing functions, decision-making functions, and/or control functions to be provided for automated driving of CAV in the scene; the FAS computing module transmits the function allocation result to the FAS communication module for transmission and backs up the function allocation result to the FAS data module; and the FAS communication module transmits the allocation tasks (e.g., according to the function allocation strategy) to the CAV system and to the CAH system for implementation.

As described herein, the technology relates to allocating functions. In some embodiments, the technology provides a FAS that allocates automated driving functions between a CAV system and a CAH system. Accordingly, in some embodiments the technology provides function allocation methods, e.g., performed by the FAS. For example, in some embodiments, function allocation comprises analyzing a scene; analyzing system functional demands; analyzing system functional restrictions; and/or distributing functions according to function demands and function constraints, e.g., using a demand-constraint matching algorithm.

In some embodiments, analyzing a scene (e.g., one or more different scenes) comprises decomposing a main scene A into multiple sub-scenes $A_m$. In some embodiments, analyzing system functional demand comprises analyzing demands for functions (e.g., sensing functions, decision-making functions, and/or control functions) of one or more sub-scenes $A_m$. In some embodiments, analyzing system functional restrictions comprises analyzing the limitations of the CAV system and/or the CAH system in the decomposed sub-scenes $A_m$. In some embodiments, the sub-scenes $A_m$ have various and/or different control and/or intelligence levels. In some embodiments, analyzing system functional demand and/or analyzing system functional restrictions produces function distribution results. In some embodiments, distributing functions according to function demands and function constraints comprises defining a demand-constraint matching algorithm using the function distribution results of analyzing functional demands of sub-scenes (e.g., all sub-scenes) and/or analyzing functional restrictions of the CAV system and/or the CAH system for the sub-scenes $A_m$. In some embodiments, distributing functions according to function demands and function constraints comprises combining function distribution results of analyzing functional demands of sub-scenes (e.g., all sub-scenes) and function distribution results of analyzing functional restrictions of the CAV system and/or the CAH system for the sub-scenes $A_m$ and determining a distribution plan to allocate functions for automated driving for the main scene A. In some embodiments, function allocation methods comprise repeating scene analysis when the main scene A changes.

For example, in some embodiments, function allocation comprises decomposing a main scene A into multiple sub-scenes $A=\{A_1, A_2, A_3, A_4\}$. In some embodiments, decomposing a main scene A into multiple sub-scenes $A=\{A_1, A_2, A_3, A_4\}$ comprises analyzing road infrastructure characteristics ($A_2$), e.g., road segments, curves, ramps, interchanges, bridges, culverts, tunnels, toll stations, etc.; analyzing road marking (e.g., road line) characteristics (As), e.g., road curvature, road radius, segment length, and slope; analyzing traffic flow characteristics (As) based on traffic flow data, e.g., traffic flow, traffic speed, traffic location, traffic density, etc.; analyzing weather condition characteristics ($A_4$), e.g., precipitation (rain, snow, hail), fog, sandstorms, thunderstorms, etc.

In some embodiments, function allocation comprises analyzing system functional demands. In some embodiments, analyzing system functional demands comprises determining and/or providing a requirement feature set ($\{B_n, C_w\}$) that implements functions for a specified control level, where $B_n$ represents the control level and the value of n is 1, 2, or 3, which correspond, respectively, to the macroscopic level, mesoscopic level, and microscopic level; and $C_w$ represents an automated driving function and the value of w is 1, 2, or 3, which correspond, respectively, to a sensing function, a decision-making making function, and a control function. In some embodiments, analyzing system functional demands further comprises formulating a scene requirement feature set based on analyzing system functional demands, e.g., using the requirement feature set $\{B_n, C_w\}$. For example, in some embodiments, the scene requirement feature set comprises sub-scenes (e.g., $A_m$) and the requirement feature set ($\{B_n, C_w\}$) to represent a certain function of the control level at a certain scene. In some embodiments, the scene requirement feature set is represented by $S_{m,n,w}=\{A_m, B_n, C_w\}$, where $A_m$ represents the sub-scene and the value of m is 1, 2, 3, or 4, corresponding to the sub-scenes identified above for A.

In some embodiments, function allocation comprises analyzing system functional limitation. In some embodiments, analyzing system function limitation comprises analyzing the functional limitation of the CAH system (e.g., under the different sub-scenes). In some embodiments, a CAH system limitation function ($I_{m,n,w}$) is constructed based on the three aspects of sensing, decision-making, and control, and the CAH system limitation function is represented as I(s). In some embodiments, analyzing system function limitation comprising analyzing the function limitation of the CAV system (e.g., under different sub-scenes). In some embodiments, a CAV system limitation function ($V_{m,n,w}$) is constructed based on the three aspects of sensing, decision-making, and control, and the CAV system limitation function is represented as V(s). In some embodiments, function allocation comprises determining the function limitation vectors $K_{A,n,w}$ for the two systems according to the demands of the sub-scene and the functional limitations of the CAV system and the CAH system. In some embodiments, determining the function limitation vectors $K_{A,n,w}$ for the two systems comprises constructing an equation as follows:

$$K_{A,n,w} = \begin{bmatrix} k_{1,n,w} \\ k_{2,n,w} \\ k_{3,n,w} \\ k_{4,n,w} \end{bmatrix} = \begin{bmatrix} V_{1,n,w} & I_{1,n,w} \\ V_{2,n,w} & I_{2,n,w} \\ V_{3,n,w} & I_{3,n,w} \\ V_{4,n,w} & I_{4,n,w} \end{bmatrix}$$

In some embodiments, function allocation comprises determining the function limitation vector for the CAVH system. In some embodiments, determining the function limitation vector for the CAVH system comprises combining all scenes from the two systems, where $F(I)_{A,n,w}$ represents the limitation function of the CAV system for the main scene A; and $F(V)_{A,n,w}$ represents the limitation function of the CAH system for the main scene A. The equations for $F(I)_{A,n,w}$ and $F(V)_{A,n,w}$ are as follows:

$$F(I)_{A,n,w} = \sum_{i=1}^{4} K_{A,n,w}(i, 2)$$

$$F(V)_{A,n,w} = \sum_{i=1}^{4} K_{A,n,w}(i, 1)$$

In some embodiments, function allocation comprises determining a final allocation strategy. In some embodiments, the final allocation strategy allocates priority to the CAV system, to the CAH system, and/or to the driver of the CAV, e.g., and/or allocates control of CAV to the CAV system, to the CAH system, and/or to the driver of the CAV. In some embodiments, the final allocation strategy provides a strategy for managing CAV and controlling CAV, e.g., providing automated driving for the driving task in the main scene A. In some embodiments, the final allocation strategy allocates priority to the CAV system and/or allocates control of CAV to the CAV system when $F(V)_{A,n,w}=0$. In some embodiments, the final allocation strategy allocates priority to the CAH system and/or allocates control of CAV to the CAH system when $F(V)_{A,n,w}\neq 0$ and $F(I)_{A,n,w}=0$. In some embodiments, the final allocation strategy allocates priority to the driver of a CAV and/or allocates control of CAV to the driver of a CAV when $F(V)_{A,n,w}\neq 0$ and $F(I)_{A,n,w}\neq 0$.

In some embodiments, function allocation repeats a function allocation method, e.g., by repeating the step of analyzing a scene, e.g., when the main scene A changes, and subsequently performing the steps of analyzing system functional demands; analyzing system functional restrictions; and/or distributing functions according to function demands and function constraints, e.g., using a demand-constraint matching algorithm, for the main scene A.

Accordingly, provided herein is a function allocation technology for a connected automated vehicle and highway system. For example, in some embodiments, the technology provides a function allocation system (FAS) for a connected automated vehicle highway (CAVH) system configured to allocate sensing functions, decision-making functions, and control functions to a connected automated vehicle (CAV) system and a connected automated highway (CAH) system. In some embodiments, the FAS comprises a communication module, a data module, and a computing module. In some embodiments, the FAS is configured to allocate sensing functions, decision-making functions, and control functions to said CAV system and to said CAH system to provide a system intelligence level S for said CAVH system to manage automated driving. In some embodiments, the system intelligence level S is 3 or greater (e.g., 3, greater than 3, 4, greater than 4, 5, greater than 5, etc.) In some embodiments, the FAS is configured to allocate sensing functions, decision-making functions, and control functions to a CAV system having an intelligence level V and a CAH system having an intelligence level I. In some embodiments, I is greater than V. In some embodiments, V is 3 or less (e.g., 3, less than 3, 2, less than 2 (e.g., 1.5), 2, less than 2, 1, less than 1, or 0) and I is 3 or greater (e.g., 3, greater than 3, 4, greater than 4, 5, greater than 5, etc.) In some embodiments, V is 2 or less (e.g., 2, less than 2 (e.g., 1.5), 2, less than 2, 1, less than 1, or 0) and I is 3 or greater (e.g., 3, greater than 3, 4, greater than 4, 5, greater than 5, etc.) In some embodiments, I does not equal V.

In some embodiments, a CAVH system comprises the CAV system, the CAH system, and the FAS. In some embodiments, the FAS is configured to provide a collaborative sensing function, a collaborative decision-making function, and a collaborative control function to said CAVH system. In some embodiments, the FAS is configured to provide a collaborative sensing function, a collaborative decision-making function, and a collaborative control function to said CAVH system to manage CAV in a scene comprising complex traffic. In some embodiments, the FAS allocates more of said control functions and/or more of said decision-making functions to said CAH system than to said CAV system. In some embodiments, the FAS allocates substantially all of said control functions and/or substantially all of said decision-making functions to said CAH system. In some embodiments, the FAS provides a collaborative sensing function, a collaborative decision-making function, and a collaborative control function to said CAVH system by allocating sensing functions, decision-making functions, and control functions to said CAV system and to said CAH system.

In some embodiments, the FAS (e.g., a CAVH comprising the FAS) further comprises a CAV. In some embodiments, a driver can assume control of CAV operation (e.g., when said CAVH system intelligence does not provide safe and/or efficient control of said CAV).

In some embodiments, the CAH system comprises a sensing module, a decision-making module, a control module; and a communication module. In some embodiments, the CAH system is configured to sense the environment. In some embodiments, the CAH system is configured to recognize static objects, moving objects, and/or road markings. In some embodiments, the CAH system is configured to detect the real-time motion state of vehicles. In some embodiments, the CAH system is configured to make decisions to control vehicles to provide an optimized traffic operation state. In some embodiments, the CAH system is configured to make decisions to optimize multiple traffic flow objectives for traffic flow in different environments. In some embodiments, the CAH system is configured to manage traffic to provide optimized traffic flow. In some embodiments, the CAH system is configured to control CAV to provide optimized traffic flow. In some embodiments, the CAH system manages traffic to meet a traffic flow goal. In some embodiments, the CAH system comprises communications infrastructure, e.g., communications infrastructure configured to provide infrastructure to cloud (I2N) communication, infrastructure to vehicle (I2V) communication, infrastructure to human (I2P) communication, and/or infrastructure to infrastructure (I2I) communication. In some embodiments, the CAH system is configured to provide reliable and/or multi-channel information exchange. In some embodiments, the CAH system is configured to provide reliable and/or multi-channel information fusion. In some embodiments, the CAH system is configured to provide reliable and/or multi-channel information exchange and/or is configured to provide reliable and/or multi-channel information fusion under different scenarios.

In some embodiments, the CAV system comprises a sensing module; a decision-making module; a control module; and a communication module. In some embodiments, the CAV system is configured to sense the movement state of CAVs and the external environment around CAVs. In some embodiments, the CAV system is configured to sense CAV location, CAV speed, CAV acceleration, road condition, weather, and/or traffic events. In some embodiments, the CAV system is configured to make decisions for CAV behavior, plan CAV paths, and/or optimize CAV trajectories. In some embodiments, the CAV system is configured to control the longitudinal and/or lateral movement of CAV. In some embodiments, the CAV system is configured to perform automated driving functions, perform advanced driving assistance functions, and/or ensure vehicle safety. In some embodiments, the CAV system comprises communications infrastructure, e.g., communications infrastructure configured to provide vehicle to cloud (V2N) communication, vehicle to vehicle (V2V) communication, vehicle to human (V2P) communication, vehicle to infrastructure (V2I) communication, and/or in-vehicle communication. In some embodiments, the CAH system is configured to provide reliable and/or multi-channel information exchange. In some embodiments, the CAH system is configured to provide reliable and/or multi-channel information fusion. In some embodiments, the CAH system is configured to provide reliable and/or multi-channel information exchange and/or is configured to provide reliable and/or multi-channel information fusion under different scenarios. In some embodiments, In some embodiments, the FAS communication module is configured to provide reliable multi-channel information exchange. In some embodiments, the FAS communication module is configured to provide reliable multi-channel information exchange under different scenarios. In some embodiments, the FAS communication module is configured to manage communication of sensing data and/or function allocation results. In some embodiments, the FAS communication module is configured to provide vehicle to cloud (V2N) communication and/or infrastructure to cloud (I2N) communication. In some embodiments, the FAS data module is configured to store sensing data and/or fuse sensing data. In some embodiments, the data is collected from multiple sources. In some embodiments, the data is standardized. In some embodiments, the FAS data module comprises a database configured to store historical real-time sensing data. In some embodiments, the FAS data module stores real-time sensing data at a schedule time interval. In some embodiments, the FAS computing module is configured to calibrate said CAVH system using sensing data. In some embodiments, the FAS computing module is configured to analyze an automated driving scene to provide automated driving functions to vehicles in said scene. In some embodiments, the FAS computing module is configured to analyze the function of the CAH system and the function of the CAV system.

In some embodiments, the FAS is configured to perform a function allocation method comprising analyzing a scene; analyzing system functional demands; analyzing system functional restrictions; and determining a function allocation using a function demand-constraint matching algorithm. In some embodiments, analyzing a scene comprises dividing a main scene A into multiple sub-scenes $\{A_1, A_2, A_3, A_4\}$, where $A_1$ represents the road facility characteristics of a road in the main scene; $A_2$ represents the road geometry characteristics of the road in the scene; $A_3$ represents the traffic flow characteristics of the road in the scene; and $A_4$ represents the weather characteristics of the road in the scene. In some embodiments, analyzing system functional demands comprises constructing a required feature set $\{B_n, C_w\}$, where $B_n$ represents a control level and $C_w$ represents a function feature; and constructing a scene requirement feature set $S_{m,n,w}=\{A_m, B_n, C_w\}$, where $A_m$ represents a sub-scene, $B_n$ represents said control level, and $C_w$ represents said function feature. In some embodiments, analyzing system functional restrictions comprises analyzing the functional limitations of the CAH system for a sub-scene; constructing a limitation function $I_{m,n,w}$ of the CAH system for said sub-scene; analyzing the functional limitations of the CAV system for said sub-scene; and constructing a limitation function $V_{m,n,w}$ of the CAV system for said sub-scene. In some embodiments, determining a function allocation (e.g., a function allocation strategy) using a function demand-constraint matching algorithm comprises calculating a function of limitation vectors $K_{A,n,w}$; calculating the limitation function of the CAH system for the main scene A, $F(I)_{A,n,w}$; calculating the limitation function of the CAV system for main scene A: $F(V)_{A,n,w}$; and providing a function allocation to provide automated driving for CAV in the main scene A according to:

$$\text{scheme} = \begin{cases} CAV \text{ system priority}, & F(V)_{A,n,w} = 0 \\ CAH \text{ system priority}, & F(V)_{A,n,w} \neq 0 \text{ and } F(I)_{A,n,w} = 0 \\ \text{Driver priority}, & F(V)_{A,n,w} \neq 0 \text{ and } F(I)_{A,n,w} \neq 0 \end{cases}.$$

In some embodiments, the FAS is configured to repeat the function allocation method when the main scene A changes.

In some embodiments, the technology provides a CAVH system comprising a connected automated highway (CAH) system, a connected automated vehicle (CAV) system, and a function allocation system (FAS). In some embodiments, the CAVH system is configured to provide collaborative sensing functions, collaborative decision-making functions, and collaborative control functions. In some embodiments, the CAVH system is configured to provide collaborative sensing functions, collaborative decision-making functions, and collaborative control functions under complex traffic conditions. In some embodiments, the FAS allocates sensing functions, decision-making functions, and/or control functions to said CAH system and/or to said CAH system, e.g., to provide collaborative sensing functions, collaborative decision-making functions, and collaborative control functions. In some embodiments, the FAS allocates more of said control functions and/or more of said decision-making functions to said CAH system than to said CAV system. In some embodiments, the FAS allocates substantially all of said control functions and/or substantially all of said decision-making functions to said CAH system. In some embodiments, the CAVH system further comprises a CAV.

In some embodiments, the CAH system comprises a sensing module, a decision-making module, a control module; and a communication module.

In some embodiments, the CAH system is configured to sense the environment. In some embodiments, the CAH system is configured to recognize static objects, moving objects, and/or road markings. In some embodiments, the CAH system is configured to detect the real-time motion state of vehicles. In some embodiments, the CAH system is configured to make decisions to control vehicles to provide an optimized traffic operation state. In some embodiments, the CAH system is configured to make decisions to optimize multiple traffic flow objectives for traffic flow in different environments. In some embodiments, the CAH system is configured to manage traffic to provide optimized traffic flow. In some embodiments, the CAH system is configured to control CAV to provide optimized traffic flow. In some embodiments, the CAH system is configured to manage traffic to meet a traffic flow goal. In some embodiments, the CAH system comprises communications infrastructure. In some embodiments, the communications infrastructure provides infrastructure to cloud (I2N) communication, infrastructure to vehicle (I2V) communication, infrastructure to human (I2P) communication, and/or infrastructure to infrastructure (I2I) communication. In some embodiments, the CAH system is configured to provide reliable and/or multichannel information exchange. In some embodiments, the CAH system is configured to provide reliable and/or multichannel information fusion. In some embodiments, the CAH system is configured to provide reliable and/or multi-channel information exchange and/or is configured to provide reliable and/or multi-channel information fusion under different scenarios.

In some embodiments, the CAV system comprises a sensing module; a decision-making module; a control module; and a communication module. In some embodiments, the CAV system is configured to sense the movement state of CAVs and the external environment around CAVs. In some embodiments, the CAV system is configured to sense CAV location, CAV speed, CAV acceleration, road condition, weather, and/or traffic events. In some embodiments, the CAV system is configured to make decisions for CAV behavior, plan CAV paths, and/or optimize CAV trajectories. In some embodiments, the CAV system is configured to control the longitudinal and/or lateral movement of CAV. In some embodiments, the CAV system is configured to perform automated driving functions, perform advanced driving assistance functions, and/or ensure vehicle safety. In some embodiments, the CAV system comprises communications infrastructure. In some embodiments, the communications infrastructure provides vehicle to cloud (V2N) communication, vehicle to vehicle (V2V) communication, vehicle to human (V2P) communication, vehicle to infrastructure (V2I) communication, and/or in-vehicle communication.

In some embodiments, the CAH system is configured to provide reliable and/or multi-channel information exchange. In some embodiments, the CAH system is configured to provide reliable and/or multi-channel information fusion. In some embodiments, the CAH system is configured to provide reliable and/or multi-channel information exchange and/or is configured to provide reliable and/or multi-channel information fusion under different scenarios.

In some embodiments, the technology provides methods for controlling vehicles (e.g., CAV) and/or to manage traffic. In some embodiments, methods for managing traffic and/or controlling CAV comprise providing a FAS as described herein. In some embodiments, methods for managing traffic and/or controlling CAV comprise providing a CAVH system (e.g., a CAVH system comprising a FAS) as described herein.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH, FAS, IRIS, or CAH system communications; and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
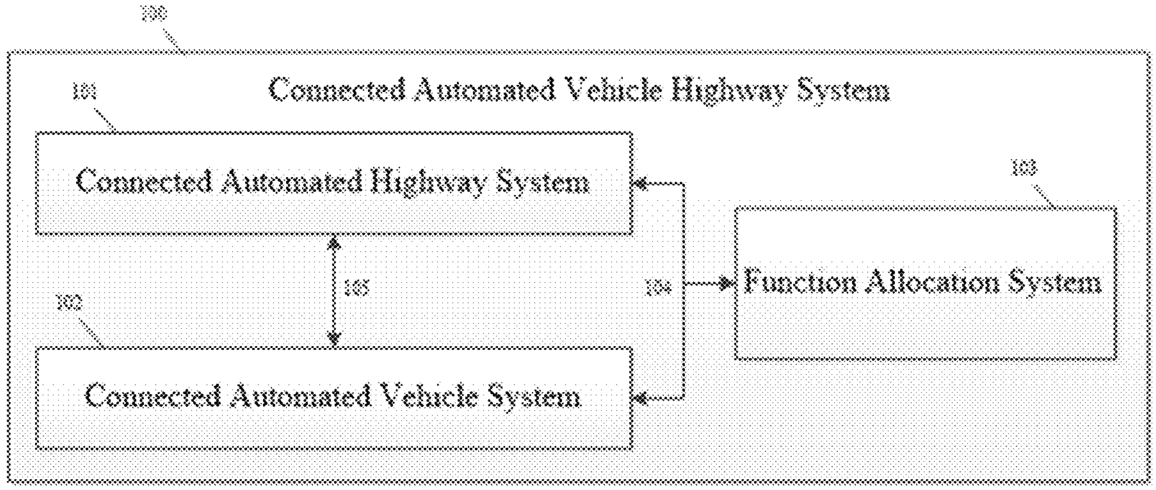
FIG. 1 is a schematic drawing showing the CAVH system, CAVH system components, and CAVH system structure. 100: CAVH system; 101: CAH system; 102: CAV system; 103: FAS for CAVH system; 104: allocation instruction sent from the FAS; 105: information exchange between the CAH system and the CAV system.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology related to function allocation for a connected automated vehicle highway (CAVH) system. In some embodiments, the technology provides systems and methods to determine the allocation of functions for automated driving tasks, e.g., at different intelligence levels and in various scenarios. Accordingly, the technology provided herein improves and/or maximizes driving safety and system efficiency of the CAVH system.

The CAVH system includes the connected automated vehicles (CAV) system, the connected automated highway (CAH) system, and the function allocation system (FAS). The CAV system and CAH system coordinate to manage one or more of the following functions: sensing, communicating, decision-making, and/or control. In some embodiments, the FAS comprises the following hardware and/or software modules: a communication module, a data module, and/or a computing module. In some embodiments, the technology provides allocation methods comprising steps and/or sub-processes for: scenario analysis, system function demand analysis, system function restriction analysis, and/or function demand-constraint matching. In some embodiments, the FAS allocates the sensing, communicating, decision-making, and/or control to the CAV and/or CAH according to the intelligence level of the CAV system and the intelligence level of the CAH system.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

DEFINITIONS

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensor-free" system does not comprise a sensor, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "Connected Automated Vehicle Highway System" ("CAVH System") refers to a comprehensive system providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: a) vehicle; b) roadside unit (RSU); c) traffic control unit (TCU); and d) traffic control center (TCC). See U.S. Pat. App. Pub. Nos. 20180336780, 20190244521, and/or 20190096238, each of which is incorporated herein by reference.

As used herein, the term "Intelligent Road Infrastructure System" ("IRIS") refers to a system that facilitates vehicle operations and control for CAVH systems. See U.S. Pat. App. Pub. Nos. 20190244521 and/or 20190096238, each of which is incorporated herein by reference.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "allocate", "allocating", and similar terms referring to resource distribution also include distributing, arranging, providing, managing, assigning, controlling, and/or coordinating resources.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIUs), traffic control signals, and/or other infrastructure (e.g., a CAH system, IRIS, and/or CAVH system) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CAVH, FAS, CAH, CAV, and/or a vehicle providing support to and/or supporting one or more other components of the ADS, CAVH, FAS, CAH, CAV, and/or a vehicle refers to, e.g., exchange of information and/or data between components and/or levels of the ADS, CAVH, FAS, CAH, CAV, and/or a vehicles, sending and/or receiving instructions between components and/or levels of the ADS, CAVH, FAS, CAH, CAV, and/or a vehicles, and/or other interaction between components and/or levels of the ADS, CAVH, FAS, CAH, CAV, and/or a vehicles that provide functions such as information exchange, data transfer, messaging, and/or alerting.

As used herein, the term "ADS component" or "component of an ADS" refers individually and/or collectively to one or more of components of an ADS and/or CAVH system, e.g., a VIU, RIU, TCC, TCU, TCC/TCU, TOC, CAV, CAH system, CAV system, CAH system, supporting subsystem, FAS, and/or cloud component.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

In some embodiments, vehicle intelligence is provided by and/or related to the CAV Subsystem and the infrastructure intelligence is provided by and/or related to the CAH system. One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

Provided herein is a technology providing a function allocation system (EAS) for a connected automated vehicle and highway system (CAVH). In some embodiments, the CAVH comprises the FAS and an intelligent network road system comprising a CAV system (e.g., comprising one or more CAV) and/or a CAH system (e.g., comprising a connected and automated highway (CAH). In some embodiments, the CAVH is supported by an intelligent network road system comprising a CAV system, CAH system, and/or a Traffic Operation Center (TOC). In some embodiments, CAV comprises a Vehicle Intelligent Unit (VIU) that provides automated driving capabilities to CAV. Accordingly, in some embodiments, the CAVH components (e.g., the CAV system and the CAH system) are managed by the FAS to collaborate and provide systems and methods for automated driving, e.g., to provide coordinated sensing; coordinated prediction and decision-making; and coordinated control for transportation management and operations and control of connected automated vehicles.

For instance, in some embodiments, the CAVH comprises a Connected Automated Vehicle (CAV) system and a Connected Automated Highway (CAH) system that are managed by the FAS in real-time. The CAV system and the CAH system interact (e.g., collaborate) and provide coordinated sensing; coordinated prediction and decision-making; and coordinated control for transportation management and operations and control of connected automated vehicles. In some embodiments, the CAH system comprises an Intelligent Road Infrastructure Subsystem (IRIS) comprising Roadside Intelligent Units (RIU), a Traffic Control Unit (TCU), and a Traffic Control Center (TCC). In some embodiments, the CAVH and/or the FAS is supported by a data information fusion computing platform comprising cloud computing, wired and wireless real-time communication networks, electricity supply networks, network security systems, high-precision maps, and/or high-precision positioning services. In some embodiments, the CAVH and/or the FAS provides one or more intelligent connected vehicle collaborative methods and/or system functions for automated driving, e.g., sensing traffic state and environment; predicting traffic behavior and making decisions; and coordinating control of traffic and vehicles.

In some embodiments, e.g., as shown in FIG. 1, the technology relates to a CAVH system 100 and providing a FAS for the CAVH system 100. The CAVH system comprises a CAH system 101, a CAV system 102, and the FAS 103. The FAS 103 exchanges an allocation instruction 104 with the CAH system 101 and the CAV system 102. The CAH system 101 and the CAV system 102 exchange information 105 with each other.

Figure 2:
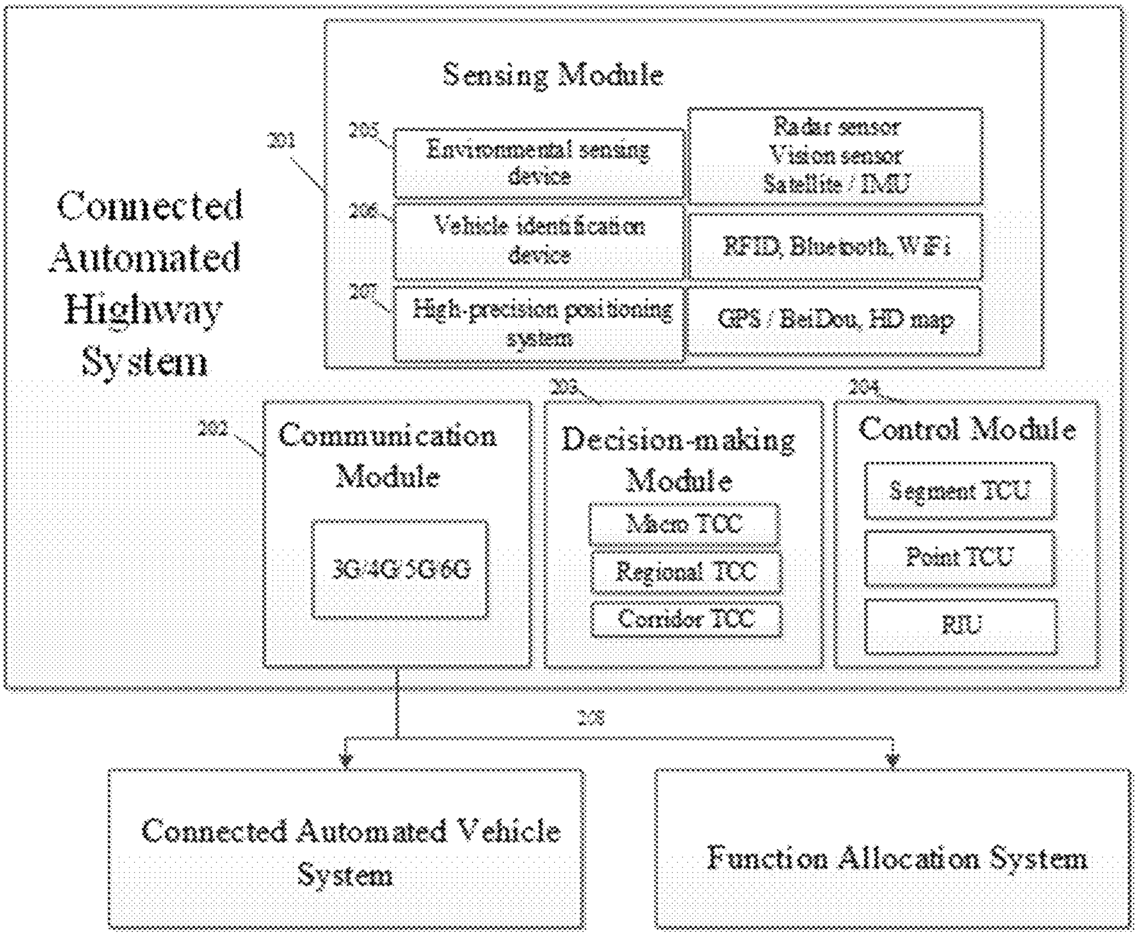
FIG. 2 is a schematic drawing showing the CAH system, CAH system components, and CAH system structure. 201: sensing module configured to sense the surrounding environment in real-time (e.g., identify static objects, identify moving objects, identify road markings, detect vehicle motion, etc.); 202: communication module configured to provide multi-channel and reliable information exchange and data fusion; 203: decision-making module configured to provide multi-objective decision-making for vehicles and provide traffic management strategies to manage dynamic traffic flow states according to the real-time traffic state; 204: control module configured to receive decision-making information and traffic control strategies and implement traffic management and vehicle control measures to optimize traffic flow and/or monitor the operation state of vehicles; 205: environmental sensing device, e.g., comprising a radar sensor, a vision sensor, a satellite/inertial measurement unit (IMU), etc.; 206: vehicle identification device, e.g., comprising RFID, Bluetooth, WiFi, etc.; 207: high-precision positioning system, e.g., comprising a GPS component, a BeiDou system (BDS) component, a high definition (HD) map, etc; 208: communication to the FAS and/or to the CAV system.

In some embodiments, e.g., as shown in FIG. 2, the CAH system comprises a sensing module 201, a communication module 202, a decision-making module 203, and a control module 204. The sensing module 201 comprises an environmental sensing device 205, a vehicle identification device 206, and/or a high-precision positioning system 207. The sensing module 201 senses information from the environment. The communication module 202 sends the sensing data to the FAS and receives an allocation result from the FAS. The decision module 203 makes an optimized decision according to the allocation result. Then, the communication module 202 sends the decision instruction made by the decision module 203 to the control module 204. The traffic (e.g., vehicles) on the highway is instructed (e.g., controlled) by the control module 204.

Figure 3:
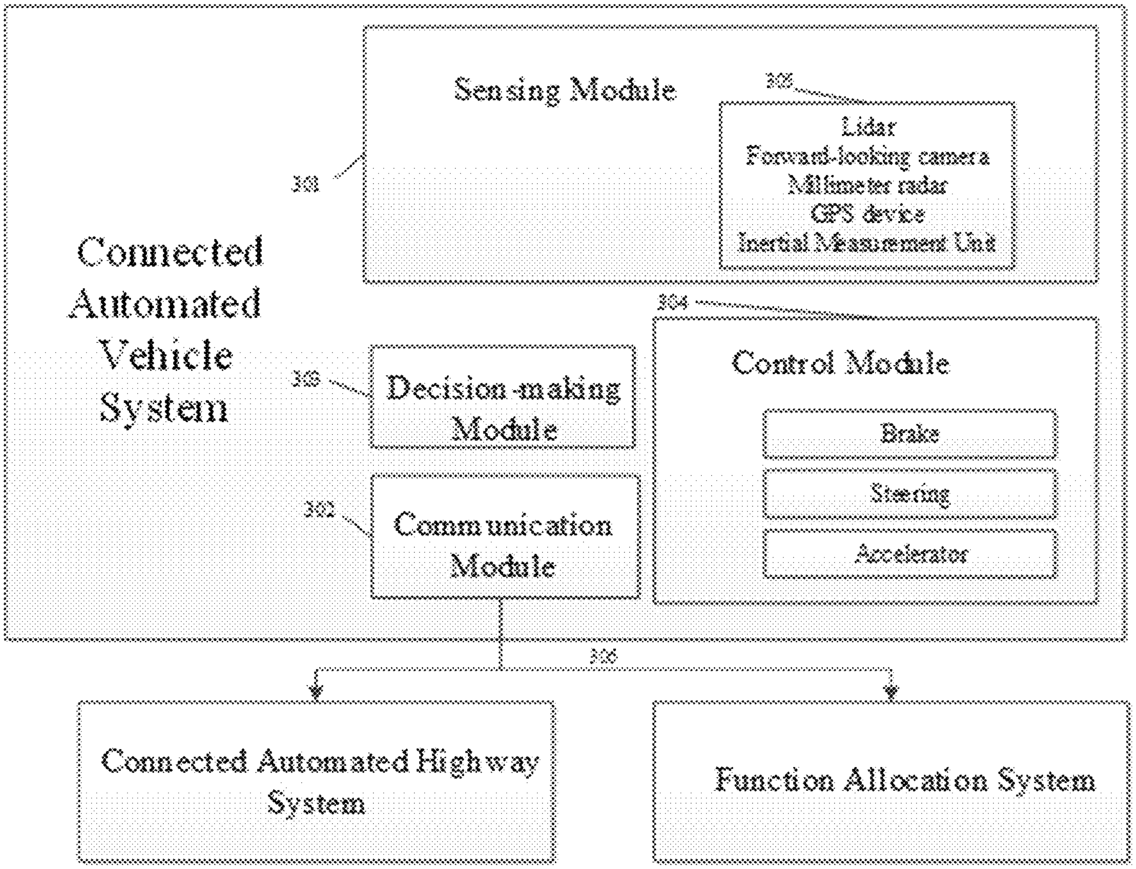
FIG. 3 is a schematic drawing showing the CAV system, CAV system components, and CAV system structure. 301: sensing module configured to sense the motion state and/or external environment of a CAV (e.g., CAV speed, CAV position, road condition, weather, events, etc.); 302: communication module configured to provide multi-channel and reliable information exchange and data fusion; 303: decision-making module configured to provide control decisions, path planning, and/or trajectory optimization of CAV; 304: control module configured to execute decision commands from the system, control the horizontal and vertical motion of CAV, and/or provide automated driving functions and/or advanced driving assistance functions (e.g., to maximize vehicle safety); 305: sensing device, e.g., comprising lidar, a camera (e.g., a forward-looking camera), millimeter radar, GPS device, IMU, etc.); 306: communication to the FAS and to the CAH system.

In some embodiments, e.g., as shown in FIG. 3, the CAV system comprises a sensing module 301, a communication module 302, a decision-making module 303, and a control module 304. The sensing module 301 senses information describing the vehicle state. The communication module 302 sends the sensing data describing vehicle state to the FAS and receives an allocation result from the FAS. The decision-making module 303 makes an optimized decision according to the allocation result. Then, the communication module 302 sends the decision instruction made by the decision-making module 303 to the control module 304 or the communication module 302 sends the decision from the CAV system to the control module 304. The control module controls the motion of the vehicle.

Figure 4:
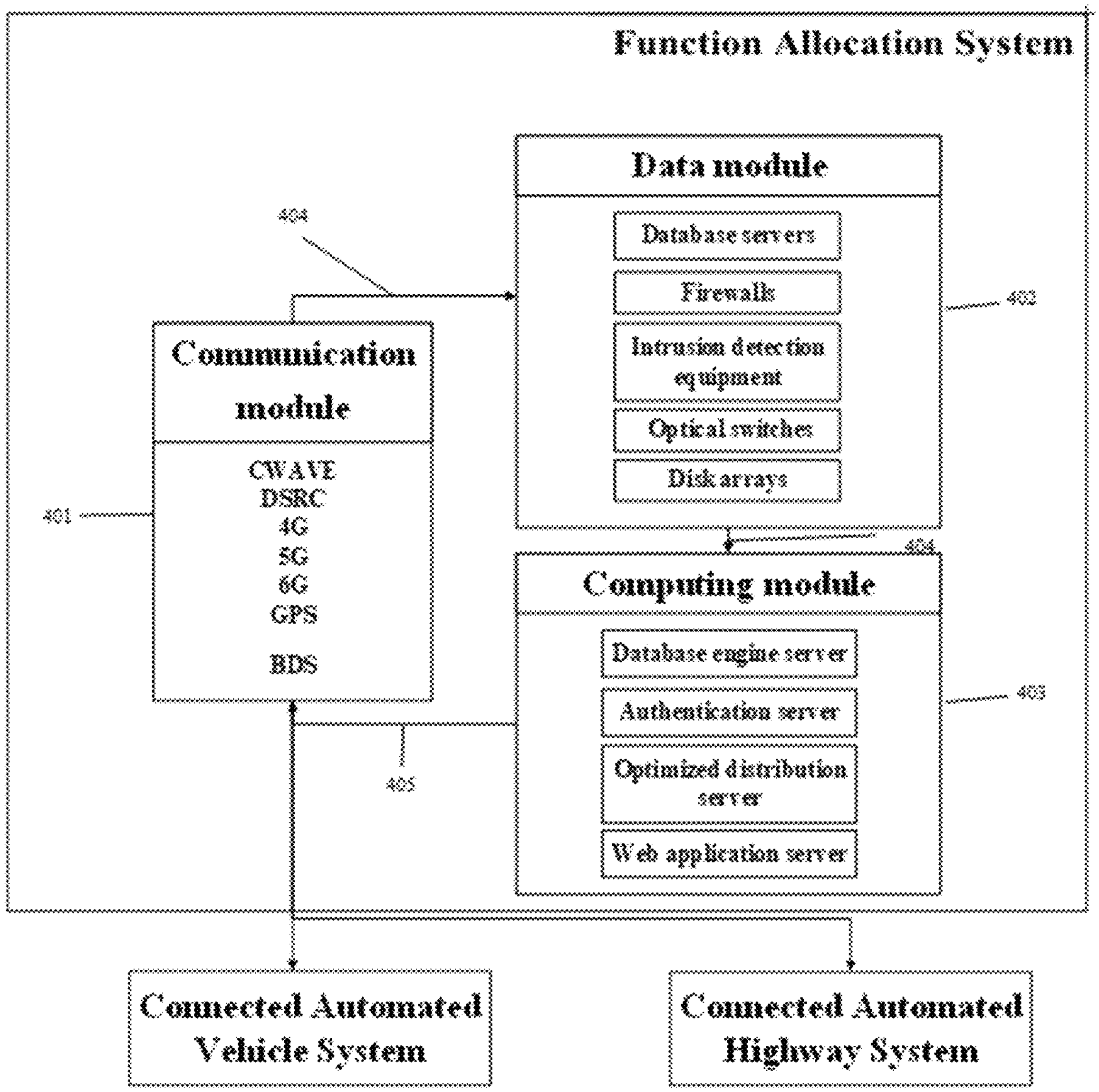
FIG. 4 is a schematic drawing showing the FAS, FAS components, and FAS structure. 401: communication module configured to provide multi-channel and reliable information exchange between the data module and computing module and to provide data fusion; 402: data module configured to receive, store, and integrate sensing data and/or configured to support receiving, storing, and integrating sensing data; 403: computing module configured to identify, determine, and/or verify the CAV system level; to identify, determine, and/or verify the CAH system level; and compute a function allocation for the CAVH system; 404: transmission of system and status data; 405: transmission of a function allocation result.

In some embodiments, e.g., as shown in FIG. 4, the FAS comprises a communication module 401, a data module 402, and a computing module 403. The communication module 401 sends data related to the system level and vehicle status 404 to the data module 402 and receives data related to allocation result 405 from the computing module 403. The computing module 403 receives processed data related to the system-level and vehicle status 404 from the data module 402. The computing module 403 allocates the automated driving function of the CAVH system based on the data related to the system-level and vehicle status 404.

Figure 5:
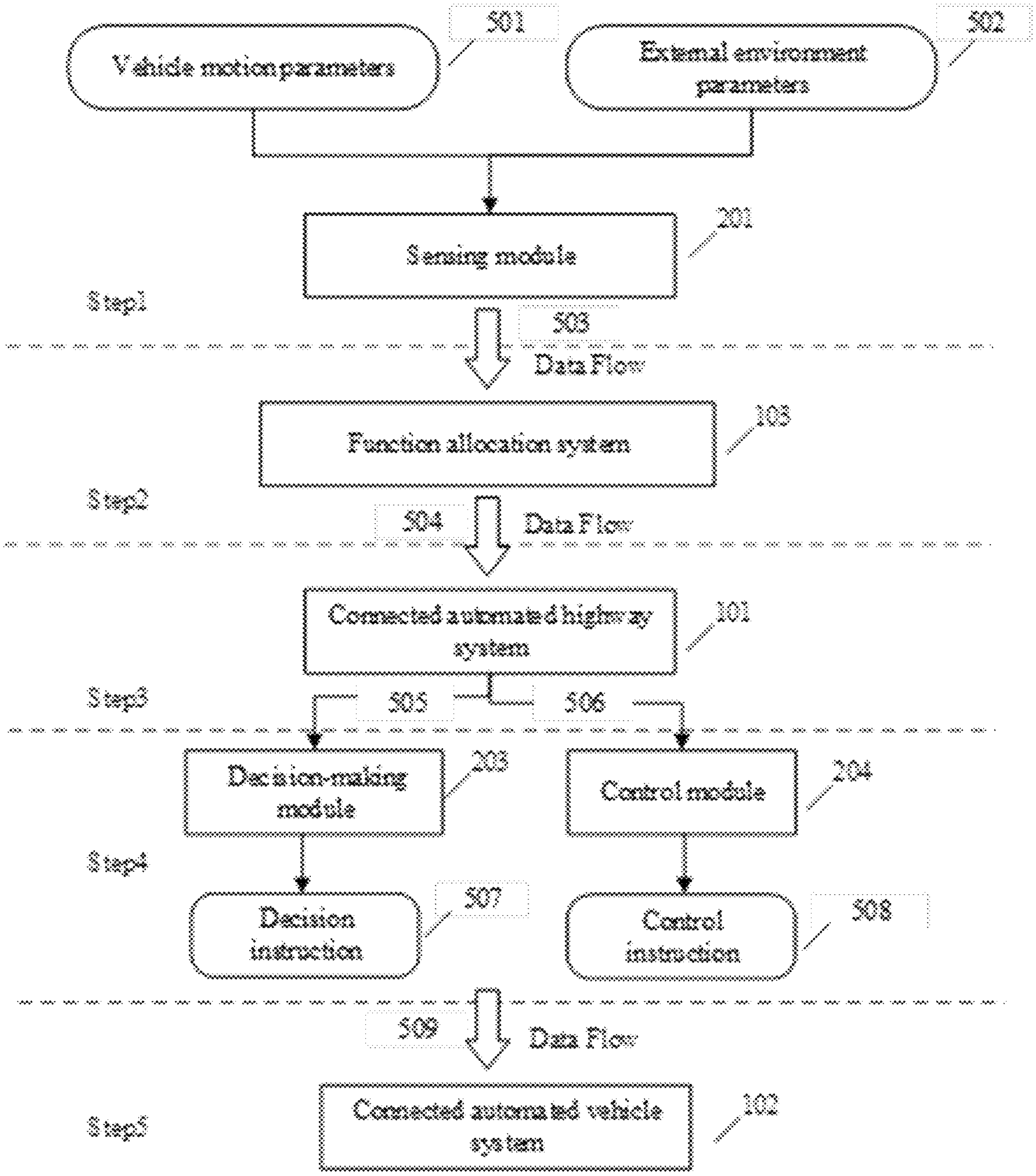
FIG. 5 is a schematic drawing showing the operating mode of the CAH system and data flows within the CAH system. 501: vehicle motion parameters sensed and/or received by the sensing module of the CAH system; 502: external environment parameters sensed and/or received by the sensing module of the CAH system; 503: data flow from the CAH system to the FAS; 504: data flow (e.g., comprising a function allocation result) from the FAS to the CAH system; 505: task instruction sent to the decision-making module; 506: task instruction sent to the control module; 507: decision instruction made by the decision-making module; 508: control instruction made by the control module; 509: data flow (e.g., comprising an instruction) to the CAV system. Features labeled 101, 102, and 103; and 201, 203, and 204 are as described above for FIG. 1 and FIG. 2, respectively.

In some embodiments, e.g., as shown in FIG. 5, the CAH system comprises an operating mode and data flows. The sensing module 201 of the CAH system 101 senses the vehicle motion parameters 501 and the external environment parameters 502; the data flow 503 is transmitted to the FAS 103; the FAS sends the allocation result 504 to the CAV system 102; the decision-making module 203 and the control module 204 of the CAH system 101 are activated by the allocation instructions 505 and 506 to formulate the decision instruction 507 and the control instruction 508, respectively; and the decision instruction 507 and the control instruction 508 made by CAH system 101 are transmitted to the CAV system 102 for the implementation of vehicle control 609.

Figure 6:
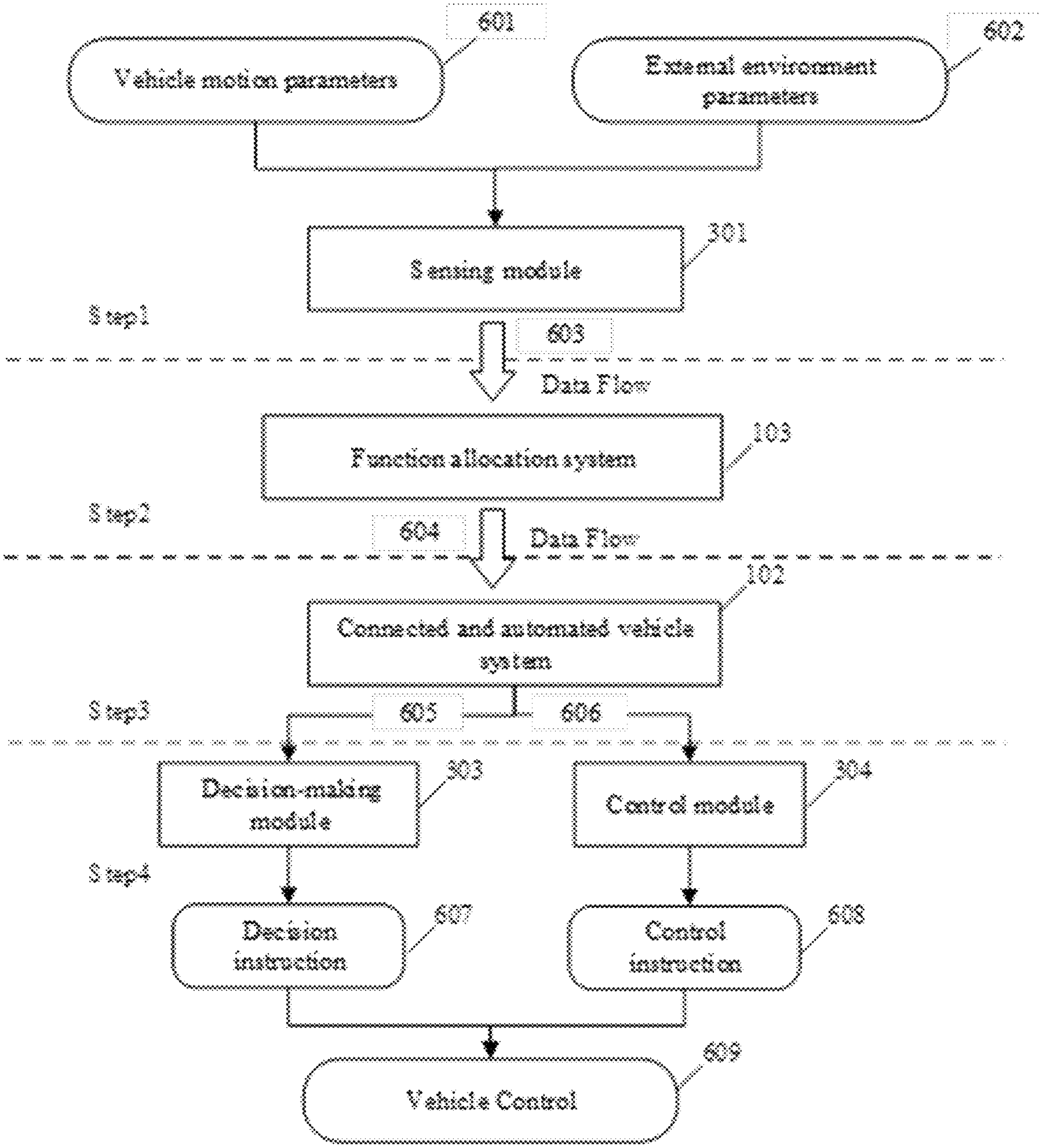
FIG. 6 is a schematic drawing showing the operating mode of the CAV system and data flows within the CAV system. 601: vehicle motion parameters sensed and/or received by the sensing module of the CAV system; 602: external environment parameters sensed and/or received by the sensing module of the CAV system; 603: data flow from the CAV system to the FAS; 604: data flow (e.g., comprising allocation results) from the FAS to the CAV system; 605: task instruction sent to the decision-making module; 606: task instruction sent to the control module; 607: decision instruction provided by the decision-making module; 608: control instruction provided by the control module; 609: vehicle control (e.g., executing a received command to control a vehicle). Features labeled 102 and 103; and 301, 303, and 304 are as described above for FIG. 1 and FIG. 3, respectively.

In some embodiments, e.g., as shown in FIG. 6, the CAV system comprises an operating mode and data flows. The sensing module 301 of the CAV 102 senses the vehicle motion parameters 601 and the external environment parameters 602; the data flow 603 is transmitted to the FAS 103; the FAS sends the allocation result 604 to the CAV system; the decision-making module 303 of the CAV system 102 is activated by the allocation instructions 605 to make decision instruction 607; meanwhile, the control module 304 of the CAV system 102 is activated by the allocation instructions 606 to make control instruction 608 for the implementation of vehicle control 609.

Figure 7:
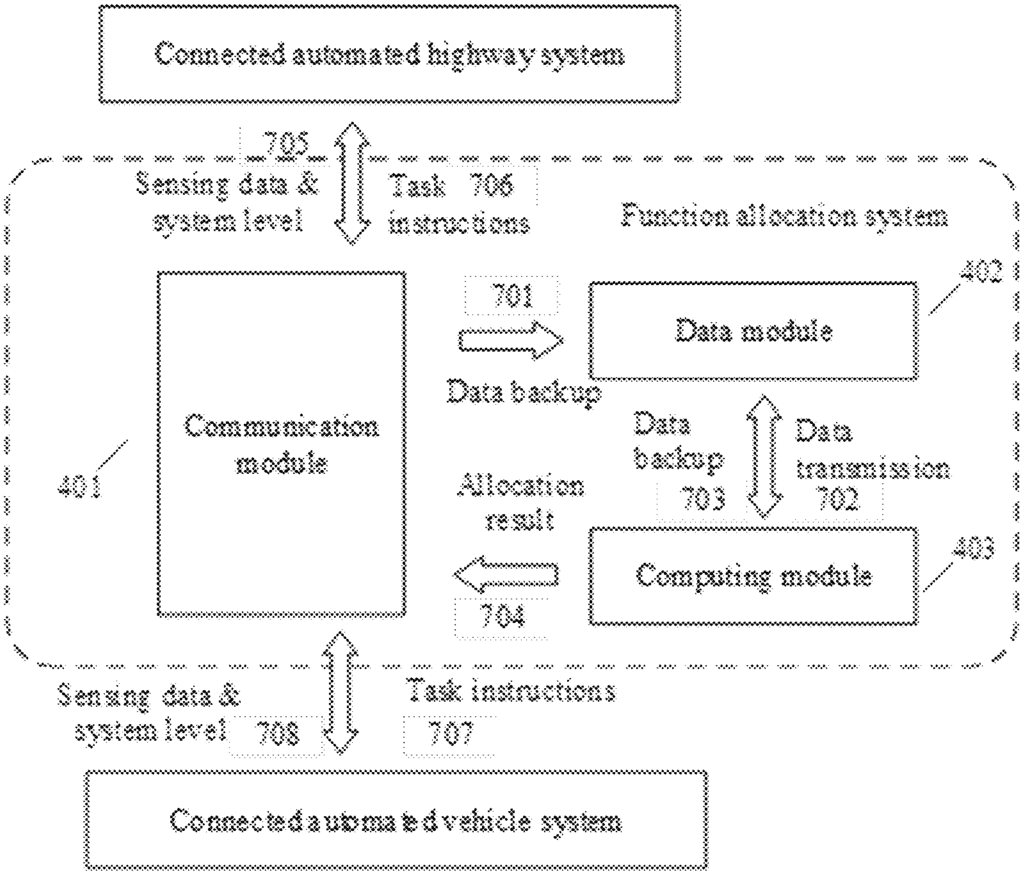
FIG. 7 is a schematic drawing showing the operating mode of the FAS and data flows within the FAS. 701: data backup from the communication module to the data module; 702: data flow from the data module to the computing module; 703: data backup from the computing module to the data module; 704: allocation result transmitted from the computing module to the communication module; 705: system level, sensing data, status data, and allocation result data sent from the CAH system to the FAS. 706: Task instructions are sent to the CAH system from the FAS; 707: task instructions sent to the CAV system from the FAS; 708: system level, sensing data, status data, and allocation result data sent from the CAV system to the FAS. Features labeled 401, 402, and 403 are as described above for FIG. 4.

In some embodiments, e.g., as shown in FIG. 7, the FAS has an operating mode and data flows. The communication module 401 receives system-level information and sensing data 705 from the CAH system 101; the communication module 401 receives system-level information and sensing data 708 from the CAV system 102. Then, data backup 701 is conducted to transmit the data 705 and 708 from the communication module 401 to the data module 402 for storage. Next, data backup 703 is conducted to store and backup environment data, and the data flow 702 is transferred to the computing module 403 for processing. Next, the computing module 403 decomposes the current scene into several sub-scenes by scenario analysis 801. Based on the system function demand analysis 802, system functional restriction analysis 803, and function demand-constraint matching algorithm 804, the FAS 103 produces a function allocation strategy to provide an automated driving function (e.g., sensing, decision-making, and/or control) at one or more control levels (e.g., macroscopic, mesoscopic, and/or microscopic). The function allocation plan includes the CAV system priority, the CAH system priority, and human driver priority. Next, the computing module 403 transmits the allocation result 704 to the communication module 401 for transmission and backs up the allocation result 704 to the data module 402 for storage. Finally, the communication module 401 sends the allocation instruction 707 to the CAV system 102 and the allocation instruction 706 to the CAH system 101 for implementation.

Figure 8:
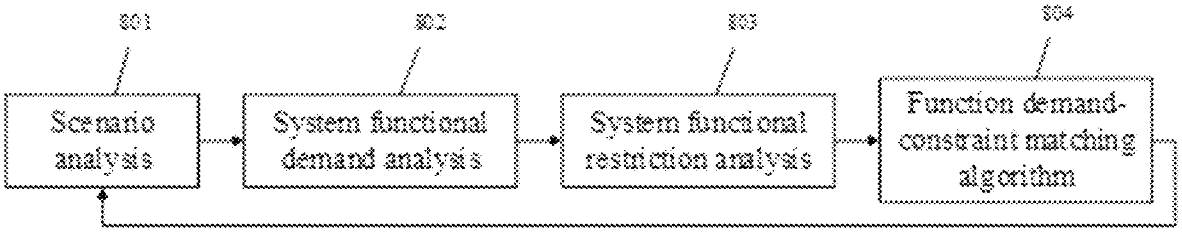
FIG. 8 is a schematic drawing showing steps of a function allocation algorithm. 801: scenario analysis, e.g., a step comprising analyzing a scenario, e.g., decomposing a main scene A into multiple sub-scenes $A_m$; 802: system functional demand analysis, e.g., a step comprising analyzing requirements for automated driving tasks in the decomposed sub-scene at different control levels; 803: system functional restriction analysis, e.g., a step comprising analyzing limitations of the CAV system and/or limitations of the CAH system in the decomposed sub-scene at different control levels; 804: function demand-constraint matching algorithm, e.g., a step comprising determining an allocation result for the automated driving task corresponding to the main scene A.

In some embodiments, e.g., as shown in FIG. 8, function allocation comprises scenario analysis 801, system functional demand analysis 802, system functional restriction analysis 803, and a function demand-constraint matching algorithm 804. The scenario analysis decomposes the main scene A into sub-scenes (e.g., 1, 2, 3, 4, 5, 6, 7, 8, 9, 10, or more sub-scenes). For each decomposed sub-scene from scenario analysis 801, the system functional demand analysis 802 analyzes the requirements for sensing functions, decision-making functions, and control functions of the automated driving task at one or more different control levels. System functional restriction analysis 803 analyzes the limitations of the CAV system and the limitations of the CAH system with respect to sensing functions, decision-making functions, and control functions at one or more different control levels. Based on the functional limitations of all sub-scenes from the system functional restriction analysis 803, the demand-constraint matching algorithm 804 is used to determine the final allocation result for the automated driving task corresponding to the main scene. Function analysis repeats the process for the main scene when the main scene changes (e.g., returns to perform scenario analysis 801, system functional demand analysis 802, system functional restriction analysis 803, and use a function demand-constraint matching algorithm 804 for the changed main scene).

Figure 9:
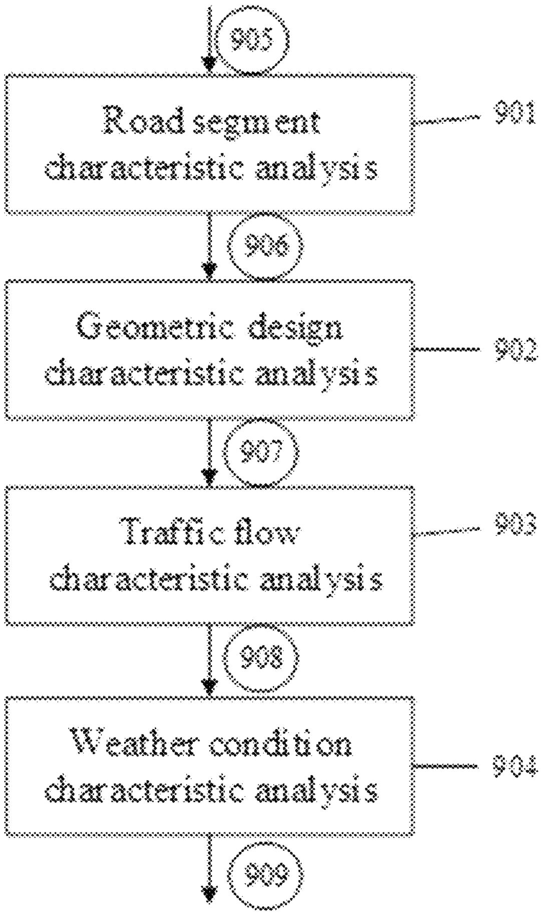
FIG. 9 is a schematic drawing showing steps of a scenario analysis process. 901: analyzing the category of a road facility (e.g., analyzing the characteristics and/or category of a road and/or road segment); 902: analyzing the characteristics of road geometry (e.g., analyzing the size, shape, design, alignment, and/or layout of a road); 903: analyzing the characteristics of traffic flow (e.g., estimating the traffic flow state); 904: analyzing the characteristics of weather conditions (e.g., analyzing weather and/or forecasting weather); 905: data describing system level and/or vehicle status; 906: sub scene $A_1$; 907: sub scene $A_2$; 908: sub scene $A_3$; 909: sub scene $A_4$.

In some embodiments, e.g., as shown in FIG. 9, scenario analysis comprises road facility analysis 901, geometric design analysis 902, traffic flow analysis 903, and weather analysis 904. Road facility analysis 901 identifies the category of a road facility and represents it as sub-scene $A_1$. Geometric design analysis 902 analyzes the characteristics of different road geometries and represents them as sub-scene $A_2$. Traffic flow analysis 903 estimates the traffic flow state and represents it as sub-scene $A_3$. Weather analysis 904 analyzes the characteristics of weather and represents them as sub-scene $A_4$.

Figure 10:
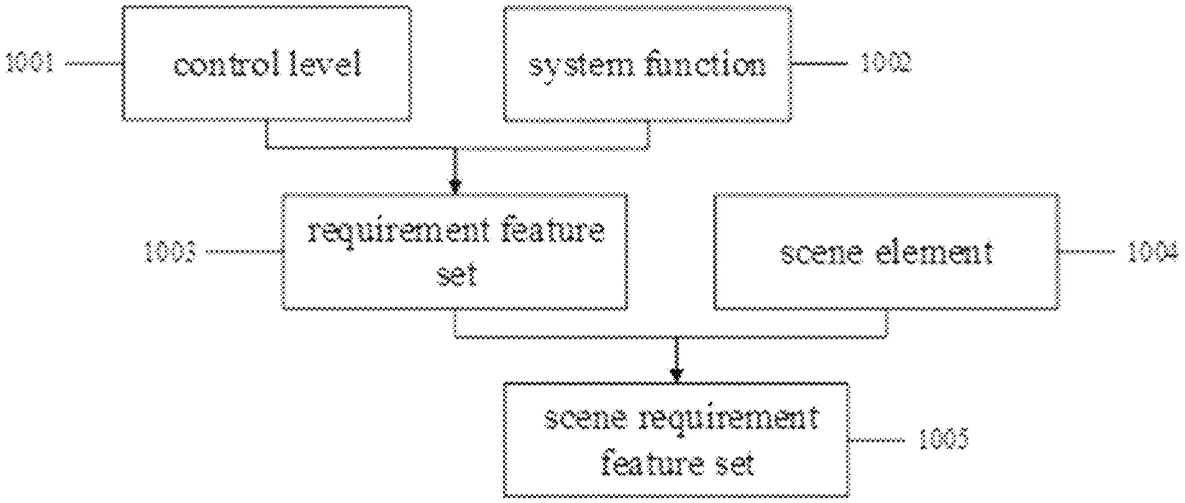
FIG. 10 is a schematic drawing showing steps of a system functional demand analysis process. 1001: control level parameter ($B_n$) comprising a macroscopic, mesoscopic, and/or microscopic control level; 1002: system function parameter ($C_w$) representing a system function, e.g., for sensing, decision-making, and/or control; 1003: requirement feature set ($\{B_n, C_w\}$) representing a function that is implemented at a control level; 1004: a sub scene ($A_m$) of a main scene (A); 1005: scene requirement feature set ($S_{m,n,w}=\{A_m, B_n, C_w\}$) that represents a function that is implemented at a control level under a sub-scene.

In some embodiments, e.g., as shown in FIG. 10, system functional demand analysis comprises constructing and/or obtaining a requirement feature set 1003 and scene requirement feature set 1005. In some embodiments system functional demand analysis comprises a requirement feature set 1003 and scene requirement feature set 1005. The requirement feature set $\{B_n, C_w\}$ 1003 comprises a control level parameter $B_n$ 1001 and a system function parameter $C_w$ 1002. There are three values (n=1, 2, 3) for the control level parameter $B_n$ 1001, representing a macroscopic level, a mesoscopic level, and a microscopic level, respectively. There are three values (w=1, 2, 3) for the system function parameter $C_w$ 1002, representing a sensing function, a decision-making function, and a control function, respectively. The scene requirement feature set $S_{m,n,w}=\{A_m,B_n,C_w\}$ is constructed using the requirement feature set $\{B_n, C_w\}$ 1003 and sub-scene $A_m$ 1004 from the scenario analysis 801.

Figure 11:
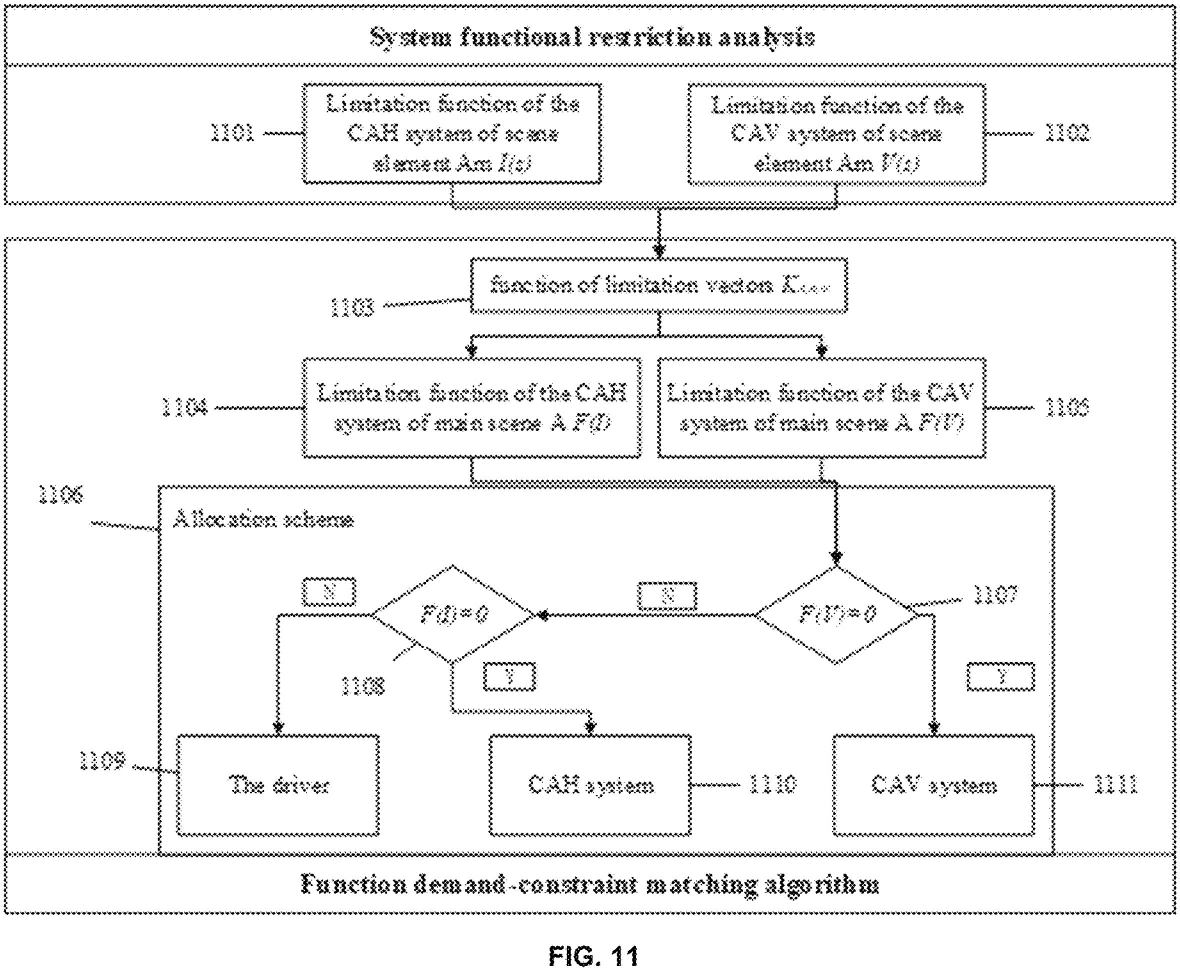
FIG. 11 is a schematic drawing showing steps of a system functional restriction analysis process and a function demand-constraint matching algorithm. 1101: limitation function of the CAH system for sub-scene $A_m$, represented as I(s) 1102: limitation function of the CAV system for sub-scene $A_m$, represented as V(s); 1103: function of limitation vectors, represented as $K_{A,n,w}$; 1104: limitation function of the CAH system for main scene A, represented as F(I); 1105: limitation function of the CAV system for main scene A, represented as F(V); 1106: allocation scheme; 1107: F(V) conditional judgment decision; 1108: F(I) conditional judgement decision; 1109: driver; 1110: CAH system; 1111: CAV system.

In some embodiments, e.g., as shown in FIG. 11, system functional restriction analysis comprises analysis of the limitations of the CAH system for a sub-scene and/or analysis of the limitations of the CAV system for a sub-scene. In some embodiments, analysis of the limitations of the CAH system for a sub-scene comprises providing and/or analyzing a limitation function of the CAH system for sub-scene $A_m$, represented as I(s) 1101. In some embodiments, analysis of the limitations of the CAV system for a sub-scene comprises providing and/or analyzing a limitation function of the CAV system for sub-scene $A_m$, represented as V(s) 1102. In some embodiments, the limitation function of the CAH system for sub-scene $A_m$, (I(s)) 1101 is defined as $I_{m,n,w}$ as follows:

$$I_{m,n,w} = \begin{cases} 1, & \text{Limited} \\ 0, & \text{Unlimited} \end{cases}$$

In some embodiments, the limitation function of the CAV system of sub-scene $A_m$ (V(s)) 1102 is defined as $V_{m,n,w}$ as follows:

$$V_{m,n,w} = \begin{cases} 1, & \text{Limited} \\ 0, & \text{Unlimited} \end{cases}$$

In some embodiments, e.g., as shown in FIG. 11, system functional restriction analysis comprises providing and/or using a function demand-constraint matching algorithm. In some embodiments, the function demand-constraint matching algorithm comprises a function of limitation vectors, represented as $K_{A,n,w}$ 1103; a limitation function of the CAH system for main scene A, represented as $F(I)_{A,n,w}$ 1104; a limitation function of the CAV system for main scene A, represented as $F(V)_{A,n,w}$ 1105; and a final allocation scheme 1106. In some embodiments, the function of limitation vectors $K_{A,n,w}$ 1103 is defined as $$K_{A,n,w} = \begin{bmatrix} k_{1,n,w} \\ k_{2,n,w} \\ k_{3,n,w} \\ k_{4,n,w} \end{bmatrix} = \begin{bmatrix} V_{1,n,w} & I_{1,n,w} \\ V_{2,n,w} & I_{2,n,w} \\ V_{3,n,w} & I_{3,n,w} \\ V_{4,n,w} & I_{4,n,w} \end{bmatrix}$$

In some embodiments, the limitation function of the CAH system for main scene A (F(I)) 1104 is defined as $F(I)_{A,n,w}$. In some embodiments, the limitation function of the CAH system for sub-scene $A_m$, (I(s)) 1101 is provided by:

$$F(I)_{A,n,w} = \sum_{i=1}^{4} K_{A,n,w}(i, 2)$$

In some embodiments, the limitation function of the CAV system for main scene A (F(V)) 1105 is defined as $F(V)_{A,n,w}$. In some embodiments, the limitation function of the CAV system for sub-scene $A_m$, (V(s)) 1102 is provided by:

$$F(V)_{A,n,w} = \sum_{i=1}^{4} K_{A,n,w}(i, 1)$$

In some embodiments, the function allocation comprises providing an allocation strategy 1106. In some embodiments, the allocation strategy is defined as follows:

1) if judgment condition 1107 is true, then the designated function is allocated to the CAV system 1110;
2) if judgment condition 1107 and 1108 are both false, then the designated function is allocated to the driver 1109;
3) otherwise, the designated function is allocated to the CAH system 1111.

In some embodiments, the allocation strategy that manages and/or provides automated driving for the main scene A is as follows:

$$\text{scheme} = \begin{cases} CAV \text{ system priority}, & F(V)_{A,n,w} = 0 \\ CAH \text{ system priority}, & F(V)_{A,n,w} \neq 0 \text{ and } F(I)_{A,n,w} = 0 \\ \text{Driver priority}, & F(V)_{A,n,w} \neq 0 \text{ and } F(I)_{A,n,w} \neq 0 \end{cases}$$

Figure 12:
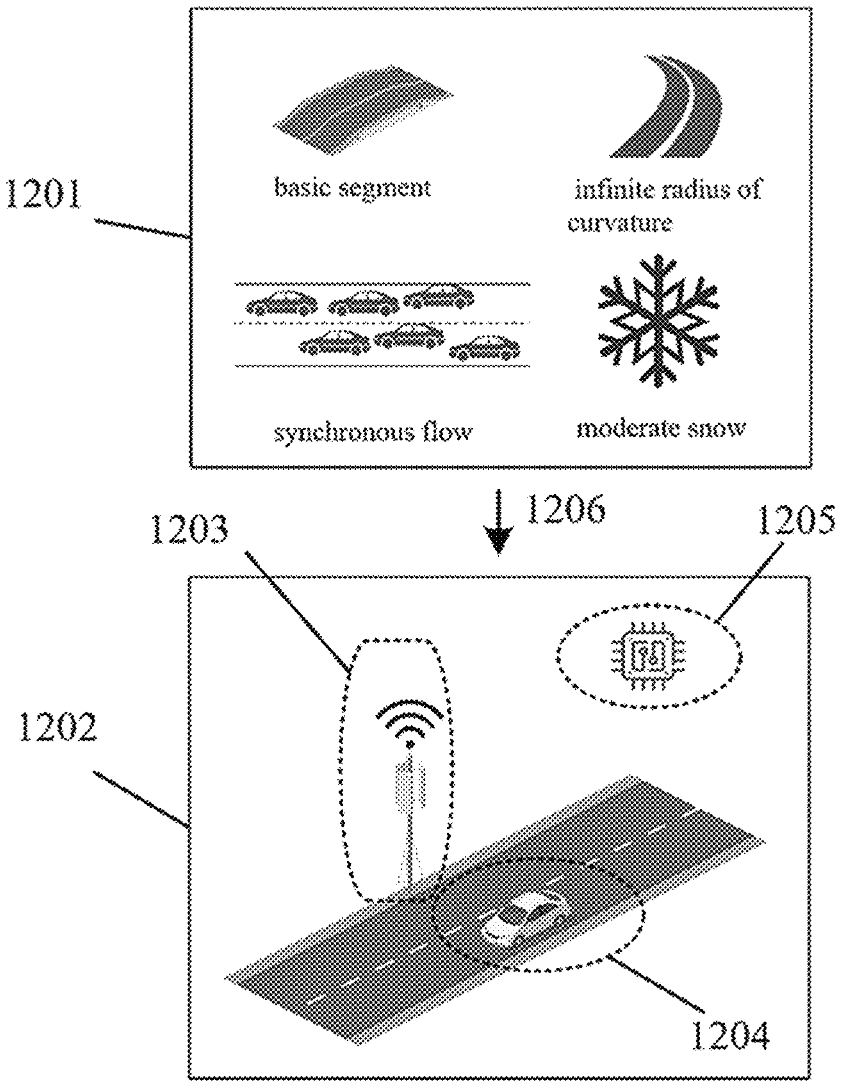
FIG. 12 is a schematic drawing showing an application of a system function allocation algorithm. 1201: an exemplary scene; 1202: CAVH system; 1203: CAH system having an intelligence level of 13; 1204: CAV system having an intelligence level of V1.5; 1205: FAS; 1206: environment where the CAVH system operates.

In some embodiments, e.g., as shown in the example provided by FIG. 12, the technology finds use in a main scene 1201 and a given CAVH system 1202. The exemplary main scene 1201 comprises four sub-scenes: the basic segment, radius of curvature, synchronous flow, and moderate snow. The CAVH system 1202 comprises a CAH system 1203, a CAV system 1204, and a FAS 1205. In the example, the intelligence level of the CAV system 1204 is V1.5 and the intelligence level of the CAH system 1203 is I3. Hence, the intelligence level of the CAVH system is S3. The data flow 1206 contains the environment where the CAVH system operates.

Accordingly, as described herein the technology provides systems and methods configured to allocate automated driving functions of a CAVH between a CAV system and a CAH system. In an exemplary system, the technology provides a CAVH system operating at a specified intelligence level S for CAV operating at a specified intelligence level V on a CAH operating at a specified intelligence level I. An exemplary situation is when the CAH intelligence level I is higher than the CAV intelligence level V. For instance, exemplary systems provide function allocation where intelligence level V is lower than level 2 (V2) (e.g., e.g., V1.5, indicating a vehicle having limited intelligence and automation functions) and the intelligence level I is 3 (I3) or more.

An exemplary CAVH system comprises a Connected Automated Highway (CAH) system; a Connected Automated Vehicle (CAV) system; and a FAS. In some embodiments, the CAVH system comprises a Traffic Operation Center (TOC) and supporting subsystems. In some embodiments, the CAH system comprises an IRIS (e.g., comprising a network of multiple Roadside Intelligent Units (RIUs), a Traffic Control Center (TCC), and Traffic Control Units (TCU)), roads (e.g., highways), and other infrastructure.

The CAH system comprises an RIU (e.g., capable of sensing and fusing traffic state information, uploading traffic state information, and issuing control instructions). The RIU comprises a coordinated sensing module, a computing and fusion module, a communication module, and a position module. The CAH system further comprises a TCU (e.g., which is capable of receiving and processing information by interacting with multiple TCUs, issuing instructions received from a TCC, integrating local and global control decisions, and receiving decision instructions from a TCC). The TCU comprises a data-exchange and control module, a communication module, a service management module, an application module, and an interactive interface. The CAH system further comprises a TCC (e.g., which is capable of controlling hardware devices and functional service interaction of the IRIS system, supporting intelligence distribution at the system level, and executing automated driving control). The TCC manages connectivity and data exchange and comprises a data service module, a transmission module, a service management module, a management application module, and a user interaction interface.

In an exemplary system, the CAV (e.g., via a VIU) interacts with the CAV system and the CAH system and cooperates with the IRIS subsystem to achieve coordinated control of the CAV. The VIU comprises limited automated driving functions (e.g., basic sensing, computing, communication, and execution) and is supported by an onboard sensing module; an onboard computing module; an onboard execution module; and an onboard communication module.

In an exemplary system, the TOC provides real-time information exchange with the TCC; automated driving service fee calculation; collection and distribution of external information provided by source agencies (e.g., including but not limited to meteorological stations, broadcasting stations, government agencies, etc.) to publish driving environment-related information to vehicles and IRIS; and roadway operations, maintenance management, construction services, and rescue services.

Exemplary systems are configured to provide function allocation methods, e.g., methods in which a FAS allocates functions to the CAV system and the CAH system to provide methods for coordinated sensing; methods for coordinated prediction and decision-making; and/or methods for coordinated control.

Automated Driving Systems (ADS)

In some embodiments, the technology provides function allocation for a vehicle operations and control system (e.g., a CAVH and technologies as described herein). In some embodiments, the CAVH comprises one or more of a roadside intelligent unit (RIU) network; a Traffic Control Unit (TCU), a Traffic Control Center (TCC); a TCU/TCC network; a vehicle intelligent unit (VIU) (e.g., a vehicle comprising a VIU); and/or a Traffic Operations Center (TOC). In some embodiments, the system comprises multiple kinds of sensors and computation devices on CAV and infrastructure (e.g., roadside infrastructure) and is configured to integrate sensing, prediction, planning, and control for automated driving of CAV (e.g., as described in U.S. Pat. App. Ser. No. 63/042,620, incorporated herein by reference.

In some embodiments, the technology relates to an ADS provided as a connected and automated vehicle highway (CAVH) system, e.g., comprising one or more components of an intelligent road infrastructure system (see, e.g., U.S. patent application Ser. No. 16/267,836 and U.S. Pat. No. 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. Pat. App. Ser. Nos. 62/894,703; 63/004,551; and 63/004,564, each of which is incorporated herein by reference). In some embodiments, the term "roadside intelligent unit" and its abbreviation "RIU" are used to refer to the components named a "roadside unit" and its abbreviation "RSU", respectively, as described for the CAVH technology in, e.g., U.S. patent application Ser. No. 16/267,836 and U.S. Pat. No. 10,380,886, each of which is incorporated herein by reference. In some embodiments, the term "vehicle intelligent unit" and its abbreviation "VIU" are used to refer to the components named an "onboard unit" and its abbreviation "OBU", respectively, as described for the CAVH technology in, e.g., U.S. patent application Ser. No. 16/267,836 and U.S. Pat. No. 10,380,886, each of which is incorporated herein by reference. In some embodiments, the term "vehicle intelligent unit" and its abbreviation "VIU" are used to refer to the components named an "onboard intelligent unit" and its abbreviation "OIU", respectively, as described in U.S. Pat. App. Ser. No. 63/042,620, incorporated herein by reference.

In some embodiments, the technology provides a system (e.g., a vehicle operations and control system comprising a RIU and/or an RIU network; a TCU/TCC network; a vehicle comprising an vehicle intelligent unit; a TOC and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network comprises an RIU subsystem. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the satellite based navigation system is a GPS, a Differential Global Positioning Systems (DGPS) system, a BeiDou Navigation Satellite System (BDS) system, or a GLONASS Global Navigation Satellite System. In some embodiments, the inertial navigation system comprises an inertial reference unit.

In some embodiments, the sensing module comprises a vehicle identification device. In some embodiments, the vehicle identification device comprises RFID, Bluetooth, Wi-fi (IEEE 802.11), or a cellular network radio, e.g., a 4G, 5G, or 6G cellular network radio.

In some embodiments, the RIU subsystem is deployed at a fixed location near a road comprising automated lanes and, optionally, human-driven lanes. In some embodiments, the RIU subsystem is deployed at a fixed location near road infrastructure. In some embodiments, the RIU subsystem is deployed near a highway roadside, a highway onramp, a highway off ramp, an interchange, intersection, a bridge, a tunnel, a toll station, or on a drone over a critical location. In some embodiments, the RIU subsystem is deployed on a mobile component. In some embodiments, the RIU subsystem is deployed on a vehicle drone over a critical location, on an unmanned aerial vehicle (UAV), at a site of traffic congestion, at a site of a traffic accident, at a site of highway construction, and/or at a site of extreme weather. In some embodiments, an RIU subsystem is positioned according to road geometry, traffic amount, traffic capacity, vehicle type using a road, road size, and/or geography of the area. In some embodiments, the RIU subsystem is installed on a gantry (e.g., an overhead assembly, e.g., on which highway signs or signals are mounted). In some embodiments, the RIU subsystem is installed using a single cantilever or dual cantilever support.

In some embodiments, the TCC network is configured to provide traffic operation optimization, data processing, and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network comprises a segment TCU or a point TCU based on based on the geographical area covered by the TCU network. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference. In some embodiments, the system comprises a point TCU physically combined or integrated with an RIU. In some embodiments, the system comprises a segment TCU physically combined or integrated with a RIU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network comprises segment TCUs configured to process information from corridor and/or point TOCs and provide control targets to point TCUs; and point TCUs configured to process information from the segment TCU and RIUs and provide vehicle-based control instructions (e.g., detailed and time-sensitive control instructions for individual vehicles) to an RIU. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the RIU network provides vehicles with customized traffic information and control instructions (e.g., detailed and time-sensitive control instructions for individual vehicles) and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, 6G, and/or wireless (e.g., IEEE 802.11) radio. In some embodiments, the TCU network comprises one or more TCUs comprising a transmission and network module configured to provide communication network function for data exchange between an automated vehicle and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCU network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and/or share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other shared mobility systems. In some embodiments, an interface allows vehicles to form a platoon with other vehicles when they are driving in the same automated vehicle dedicated lane.

In some embodiments, the VIU comprises a communication module configured to communicate with an RIU. In some embodiments, the VIU comprises a communication module configured to communicate with another VIU. In some embodiments, the VIU comprises a data collection module configured to collect data from external vehicle sensors and internal vehicle sensors; and to monitor vehicle status and driver status. In some embodiments, the VIU comprises a vehicle control module configured to execute control instructions for driving tasks. In some embodiments, the driving tasks comprise car following and/or lane changing. In some embodiments, the control instructions are received from an RIU. In some embodiments, the VIU is configured to control a vehicle using data received from an RIU. In some embodiments, the data received from the RIU comprises vehicle control instructions (e.g., detailed and time-sensitive control instructions for individual vehicles); travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, a VIU is configured to send data to an RIU. In some embodiments, the data sent to the RIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the VIU is configured to collect data comprising vehicle engine status; vehicle speed; surrounding objects detected by vehicles; and/or driver conditions. In some embodiments, the VIU is configured to assume control of a vehicle. In some embodiments, the VIU is configured to assume control of a vehicle when the automated driving system fails. In some embodiments, the VIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

Although the disclosure herein refers to certain illustrated embodiments, it is to be understood that these embodiments are presented by way of example and not by way of limitation.

EXAMPLE

During the development of embodiments of the technology provided herein, the FAS technology was modeled for a particular CAVH system having an intelligence level of S3, and wherein the CAV system intelligence level is 1.5 (V1.5), and the CAH system intelligence level is 3 (I3). See, e.g., FIG. 12.

The CAVH system functions are sensing, decision-making, and control. CAVH sensing functions are provided by the CAH system, which provides environmental sensing using a radar sensor, vision sensor, and a satellite/inertial measurement unit (IMU). CAVH sensing functions are also provided in part by the CAV system, which provides sensing using GPS, IMU, and a forward-looking camera. CAVH sensing functions are provided more by the CAH system than the CAV system (e.g., the CAH system provides most of the CAVH sensing functions).

The CAH system provides traffic management and vehicle guidance strategies for global optimization of traffic. The CAH system traffic management and vehicle guidance strategies include lane-level traffic control measures (e.g., lane management and variable speed limit control). The CAV system makes decisions in simple emergencies.

The CAH system provides vehicle control by sending control instructions to the CAV system; the CAV system executes the control instructions received from the CAH system or executes control operations based on the CAV decision-making module.

The FAS receives system-level information and environment sensing data sent from the CAV system and the CAH system through its communication module, then stores these data and transmits the data to the computing module through the data module. The functions are allocated with the functional limitation analysis method in the calculation module. The allocation function performs scene analysis, system functional demand analysis, system functional limitation analysis, and provides an allocation strategy according to function demand-constraint matching algorithm.

The scene analysis module, function, and/or method detects a scene at time step t and identifies the current scene as comprising a synchronized traffic flow state on a straight line road segment and active precipitation that is snow. The scene analysis functions and/or methods define the scene A to comprise the sub scenes of a basic segment, infinite radius of curvature, synchronous flow, and moderate stow, e.g., A={basic segment, infinite radius of curvature, synchronous flow, moderate snow}, where $A_1$=basic segment, $A_2$=the infinite radius of curvature, $A_3$=synchronous flow, and $A_4$=moderate snow.

The system functional demand analysis module, function, and/or method receives the analysis results from the scene analysis and produces a scene requirement feature set $S_{m,n,1}=\{A_m,B_n,C_1\}$, where $A_m$ represents the sub-scene, and the value of m is 1, 2, 3, or 4 respectively; $B_n$ represents the control level, and the value of n is 1, 2, or 3, which respectively represent the macroscopic level, the mesoscopic level, and the microscopic level; and $C_1$ represents the system sensing function. The characteristic results of $\{B_n, C_1\}$ are as follows:

$\{B_1, C_1\}$=sensing results of the characteristics of macro traffic (flow, speed, and density) and weather;

$\{B_2, C_1\}$=sensing results of the characteristics of road sections, road line types, local traffic events;

$\{B_3, C_1\}$=sensing results of the position, speed, acceleration, deceleration, and environment of CAV; and identification of the emergencies.

The system functional limitation analysis module, function, and/or method analyzes the function limitation of the CAH system under different sub-scenes and constructs the sensing function $I_{m,n,1}$. The system functional limitation analysis module, function, and/or method analyzes the function limitation of the CAV system under different sub-scenes and constructs the sensing function $V_{m,n,1}$. The system functional limitation analysis module, function, and/or method uses a function demand-constraint matching algorithm to determine the function of limitation vectors $K_{A,n,1}$ for the two systems to represent the systems sensing limitation for the main scene A when the control level is n. The meanings of m, n, A are defined as above. The result is as follows:

$$K_{A,1,1}=\begin{bmatrix}1&0\\1&0\\1&0\\1&0\end{bmatrix},\ K_{A,2,1}=\begin{bmatrix}1&0\\1&0\\1&0\\1&0\end{bmatrix},\ K_{A,3,1}=\begin{bmatrix}0&0\\0&0\\0&0\\1&0\end{bmatrix}$$

The functions of the limitation vector of the CAVH system are determined by combining all scenes from the two systems, where $F(V)_{A,n,w}$ represents the limitation function of the CAV system for the main scene A, and $F(I)_{A,n,w}$ represents the limitation function of the CAH system for the main scene A:

$$\begin{bmatrix}F(V)_{A,1,1} & F(I)_{A,1,1}\\F(V)_{A,2,1} & F(I)_{A,1,1}\\F(V)_{A,3,1} & F(I)_{A,1,1}\end{bmatrix}=\begin{bmatrix}\sum_{i=1}^{4}K_{A,1,1}(i,1) & \sum_{i=1}^{4}K_{A,1,1}(i,2)\\\sum_{i=1}^{4}K_{A,2,1}(i,1) & \sum_{i=1}^{4}K_{A,2,1}(i,2)\\\sum_{i=1}^{4}K_{A,3,1}(i,1) & \sum_{i=1}^{4}K_{A,3,1}(i,2)\end{bmatrix}=\begin{bmatrix}4&0\\4&0\\1&0\end{bmatrix}$$

According to the final allocation strategy for the modeled scenario comprising a synchronized traffic flow state on a straight line segment when it is snowing, the macroscopic level, mesoscopic level, and microscopic level sensing functions of the CAVH system are all allocated to the CAH system. The communication module of the FAS sends the allocation result to the CAH system and the CAV system.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A function allocation system (FAS), comprising:
a communication module;
a data module; and
a computing module,
wherein said computing module is used to:
analyze a scene according to sensing data;
analyze automated driving function requirements for a number of scenes;
deploy a function allocation method; and
analyze functioning of a connected automated highway (CAH) system and a connected automated vehicle (CAV) system;
wherein said function allocation method determines a function allocation of sensing functions, decision-making functions, and/or control functions;
wherein said FAS is configured to allocate sensing functions, decision-making functions, and/or control functions to the CAV system and to the CAH system according to said function allocation;
wherein said function allocation method comprises analyzing a scene; analyzing system functional demands; analyzing system functional restrictions; and determining the function allocation using a function demand-constraint matching algorithm; and
wherein analyzing system functional demands comprises constructing a required feature set $\{B_n, C_w\}$, wherein $B_n$ represents a control level and $C_w$ represents a function feature; and constructing a scene requirement feature set $S_{m,n,w}=\{A_m, B_n, C_w\}$, wherein $A_m$ represents a sub-scene, $B_n$ represents said control level, and $C_w$ represents said function feature.

2. The FAS of claim 1, wherein said FAS is configured to allocate sensing functions, decision-making functions, and/or control functions to said CAV system having a vehicle intelligence level V and to said CAH system having an infrastructure intelligence level I to provide a system intelligence level S for a connected automated vehicle highway (CAVH) system to manage automated driving.

3. The FAS of claim 1, wherein analyzing a scene comprises dividing a scene A into multiple sub-scenes $\{A_1, A_2, A_3, A_4\}$, wherein $A_1$ represents road facility characteristics of a road in the scene A; $A_2$ represents road geometry characteristics of the road in the scene A; $A_3$ represents traffic flow characteristics of the road in the scene A; and $A_4$ represents weather characteristics of the road in the scene A.

4. The FAS of claim 1, wherein analyzing system functional restrictions comprises analyzing functional limitations of the CAH system for a sub-scene;
constructing a limitation function $I_{m,n,w}$ of the CAH system for said sub-scene;
analyzing functional limitations of the CAV system for said sub-scene; and
constructing a limitation function $V_{m,n,w}$ of the CAV system for said sub-scene.

5. The FAS of claim 1, wherein determining the function allocation using a function demand-constraint matching algorithm comprises:
calculating a function of limitation vectors $K_{A,n,w}$;
calculating a limitation function of the CAH system for the scene A, $F(I)_{A,n,w}$;
calculating a limitation function of the CAV system for the scene A: $F(V)_{A,n,w}$; and
providing a function allocation to provide automated driving for the CAV system in the scene A according to:

$$\text{scheme} = \begin{cases} CAV \text{ system priority}, & F(V)_{A,n,w} = 0 \\ CAH \text{ system priority}, & F(V)_{A,n,w} \neq 0 \text{ and } F(I)_{A,n,w} = 0 \\ \text{Driver priority}, & F(V)_{A,n,w} \neq 0 \text{ and } F(I)_{A,n,w} \neq 0 \end{cases}.$$

6. The FAS of claim 1, wherein the FAS receives system-level information and environmental sensing data from the CAV system and the CAH system through the communication module, stores the system-level information and the environmental sensing data in the data module, and transmits the system-level information and the environmental sensing data to the computing module.

7. The FAS of claim 1, wherein a vehicle intelligent unit (VIU) is configured to assume control of a vehicle when a vehicle condition and/or a traffic condition prevents an automated driving system of the vehicle from driving the vehicle, wherein the vehicle condition and/or the traffic condition is an adverse weather condition, a traffic incident, a system failure, and/or a communication failure.

8. The FAS of claim 1, wherein:
the CAH system provides traffic management and vehicle guidance strategies for global optimization of traffic, wherein the traffic management and vehicle guidance strategies include lane-level traffic control measures comprising lane management and variable speed limit control; and
the CAV system makes decisions in simple emergencies.

9. The FAS of claim 1, wherein said communication module is configured to provide multi-channel information and manage communication of sensing data and/or the function allocation.

10. The FAS of claim 1, wherein said data module is configured to store sensing data and/or to fuse sensing data.

11. A function allocation system (FAS), comprising:
a communication module;
a data module; and
a computing module,
wherein said computing module is used to:
analyze a scene according to sensing data;
analyze automated driving function requirements for a number of scenes;
deploy a function allocation method; and
analyze functioning of a connected automated highway (CAH) system and a connected automated vehicle (CAV) system;
wherein said function allocation method determines a function allocation of sensing functions, decision making functions, and/or control functions;
wherein said FAS is configured to allocate sensing functions, decision-making functions, and/or control functions to the CAV system and to the CAH system according to said function allocation;
wherein said function allocation method comprises analyzing a scene; analyzing system functional demands; analyzing system functional restrictions; and determining the function allocation using a function demand-constraint matching algorithm; and wherein analyzing system functional restrictions comprises analyzing functional limitations of the CAH system for a sub-scene; constructing a limitation function $I_{m,n,w}$ of the CAH system for said sub-scene; analyzing functional limitations of the CAV system for said sub-scene; and constructing a limitation function $V_{m,n,w}$ of the CAV system for said sub-scene.

12. The FAS of claim 11, wherein analyzing a scene comprises dividing a scene A into multiple sub-scenes $\{A_1, A_2, A_3, A_4\}$, wherein $A_1$ represents road facility characteristics of a road in the scene A; $A_2$ represents road geometry characteristics of the road in the scene A; $A_3$ represents traffic flow characteristics of the road in the scene A; and $A_4$ represents weather characteristics of the road in the scene A.

13. The FAS of claim 11, wherein analyzing system functional demands comprises constructing a required feature set $\{B_n, C_w\}$, wherein $B_n$ represents a control level and $C_w$ represents a function feature; and constructing a scene requirement feature set $S_{m,n,w}=\{A_m, B_n, C_w\}$, wherein $A_m$ represents a sub-scene, $B_n$ represents said control level, and $C_w$ represents said function feature.

14. The FAS of claim 11, wherein determining the function allocation using a function demand-constraint matching algorithm comprises:

calculating a function of limitation vectors $K_{A,n,w}$;

calculating a limitation function of the CAH system for the scene A, $F(I)_{A,n,w}$;

calculating a limitation function of the CAV system for the scene A: $F(V)_{A,n,w}$; and providing a function allocation to provide automated driving for the CAV system in the scene A according to:

$$\text{scheme} = \begin{cases} CAV \text{ system priority}, & F(V)_{A,n,w} = 0 \\ CAH \text{ system priority}, & F(V)_{A,n,w} \neq 0 \text{ and } F(I)_{A,n,w} \neq 0 \\ \text{Driver priority}, & F(V)_{A,n,w} \neq 0 \text{ and } F(I)_{A,n,w} \neq 0 \end{cases}.$$

15. The FAS of claim 11, wherein the FAS receives system-level information and environmental sensing data from the CAV system and the CAH system through the communication module, stores the system-level information and the environmental sensing data in the data module, and transmits the system-level information and the environmental sensing data to the computing module.

16. A function allocation system (FAS), comprising:

a communication module;

a data module; and a computing module, wherein said computing module is used to:

analyze a scene according to sensing data;

analyze automated driving function requirements for a number of scenes;

deploy a function allocation method; and analyze functioning of a connected automated highway (CAH) system and a connected automated vehicle (CAV) system;

wherein said function allocation method determines a function allocation of sensing functions, decision-making functions, and/or control functions;

wherein said FAS is configured to allocate sensing functions, decision-making functions, and/or control functions to the CAV system and to the CAH system according to said function allocation;

wherein said function allocation method comprises analyzing a scene; analyzing system functional demands; analyzing system functional restrictions; and determining the function allocation using a function demand-constraint matching algorithm; and wherein determining the function allocation using a function demand-constraint matching algorithm comprises:

calculating a function of limitation vectors $K_{A,n,w}$;

calculating a limitation function of the CAH system for a scene A, $F(I)_{A,n,w}$;

calculating a limitation function of the CAV system for the scene A: $F(V)_{A,n,w}$; and providing a function allocation to provide automated driving for the CAV system in the scene A according to:

$$\text{scheme} = \begin{cases} CAV \text{ system priority}, & F(V)_{A,n,w} = 0 \\ CAH \text{ system priority}, & F(V)_{A,n,w} \neq 0 \text{ and } F(I)_{A,n,w} \neq 0 \\ \text{Driver priority}, & F(V)_{A,n,w} \neq 0 \text{ and } F(I)_{A,n,w} \neq 0 \end{cases}.$$

17. The FAS of claim 16, wherein analyzing a scene comprises dividing a scene A into multiple sub-scenes $\{A_1, A_2, A_3, A_4\}$, wherein $A_1$ represents road facility characteristics of a road in the scene A; $A_2$ represents road geometry characteristics of the road in the scene A; $A_3$ represents traffic flow characteristics of the road in the scene A; and $A_4$ represents weather characteristics of the road in the scene A.

18. The FAS of claim 16, wherein analyzing system functional demands comprises constructing a required feature set $\{B_n, C_w\}$, wherein $B_n$ represents a control level and $C_w$ represents a function feature; and constructing a scene requirement feature set $S_{m,n,w}=\{A_m, B_n, C_w\}$, wherein $A_m$ represents a sub-scene, $B_n$ represents said control level, and $C_w$ represents said function feature.

19. The FAS of claim 16, wherein analyzing system functional restrictions comprises analyzing functional limitations of the CAH system for a sub-scene;

constructing a limitation function $I_{m,n,w}$ of the CAH system for said sub-scene;

analyzing functional limitations of the CAV system for said sub-scene; and constructing a limitation function $V_{m,n,w}$ of the CAV system for said sub-scene.

20. The FAS of claim 16, wherein the FAS receives system-level information and environmental sensing data from the CAV system and the CAH system through the communication module, stores the system-level information and the environmental sensing data in the data module, and transmits the system-level information and the environmental sensing data to the computing module.

* * * * *